(12) United States Patent
Vangal et al.

(10) Patent No.: US 7,181,544 B2
(45) Date of Patent: Feb. 20, 2007

(54) NETWORK PROTOCOL ENGINE

(75) Inventors: Sriram R. Vangal, Portland, OR (US); Yatin Hoskote, Portland, OR (US); Nitin Y. Borkar, Beaverton, OR (US); Jianping Xu, Portland, OR (US); Vasantha K. Erraguntla, Beaverton, OR (US); Shekhar Y. Borkar, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 790 days.

(21) Appl. No.: 10/234,492

(22) Filed: Sep. 3, 2002

(65) Prior Publication Data

US 2004/0193733 A1    Sep. 30, 2004

(51) Int. Cl.
*G06F 15/16* (2006.01)
(52) U.S. Cl. .............. 709/250; 709/230; 709/232; 709/233; 709/236; 709/247
(58) Field of Classification Search .......... 709/230, 709/232, 233, 236, 247, 250
See application file for complete search history.

(56) References Cited

U.S. PATENT DOCUMENTS

| | | | |
|---|---|---|---|
| 4,782,439 A | 11/1988 | Borkar et al. | |
| 4,975,929 A | 12/1990 | Apple et al. | |
| 5,047,922 A | 9/1991 | Borkar | |
| 5,546,023 A | 8/1996 | Borkar et al. | |
| 5,602,845 A | 2/1997 | Wahl | |
| 5,613,071 A | 3/1997 | Rankin et al. | |
| 5,937,169 A * | 8/1999 | Connery et al. ............ | 709/250 |
| 6,061,362 A | 5/2000 | Muller et al. | |
| 6,075,392 A | 6/2000 | Sanders | |
| 6,112,309 A | 8/2000 | Inoue et al. | |
| 6,195,353 B1 | 2/2001 | Westberg | |
| 6,246,684 B1 * | 6/2001 | Chapman et al. ........... | 370/394 |
| 6,272,621 B1 | 8/2001 | Key et al. | |
| 6,373,289 B1 | 4/2002 | Martin et al. | |
| 6,385,211 B1 | 5/2002 | Williams et al. | |
| 6,415,388 B1 | 7/2002 | Browning et al. | |
| 6,434,620 B1 | 8/2002 | Boucher et al. | |
| 6,438,609 B1 | 8/2002 | Geiner et al. | |
| 6,473,425 B1 | 10/2002 | Bellaton et al. | |
| 6,701,339 B2 | 3/2004 | Vangal et al. | |
| 6,735,218 B2 * | 5/2004 | Chang et al. ............... | 370/471 |
| 6,741,107 B2 | 5/2004 | Borkar et al. | |
| 6,751,194 B1 | 6/2004 | Ueno | |

(Continued)

FOREIGN PATENT DOCUMENTS

EP    0 757 495 A1    2/1997

(Continued)

OTHER PUBLICATIONS

EZ Chip Technologies, Network Processor Designs for Next Generation Networking Equipment, Dec. 27, 1999, pp. 1-4.

(Continued)

*Primary Examiner*—Yves Dalencourt
(74) *Attorney, Agent, or Firm*—Robert A. Greenberg

(57) ABSTRACT

Packet processing techniques that can be used, for example, by a network protocol off-load engine. For example, the techniques may be used in an engine that performs transmission control protocol (TCP) operations for received packets for a host.

26 Claims, 16 Drawing Sheets

U.S. PATENT DOCUMENTS

| | | |
|---|---|---|
| 6,823,437 B2 | 11/2004 | Boyd et al. |
| 6,847,617 B2 | 1/2005 | Borkar et al. |
| 6,853,644 B1 | 2/2005 | Vangal et al. |
| 2001/0023460 A1 | 9/2001 | Boucher |
| 2001/0055464 A1 | 12/2001 | Miyaki et al. |
| 2002/0087732 A1* | 7/2002 | Boucher et al. ............ 709/250 |
| 2002/0095512 A1* | 7/2002 | Rana et al. ................. 709/232 |
| 2002/0112143 A1 | 8/2002 | Matsuura et al. |
| 2002/0172229 A1 | 11/2002 | Parvin et al. |
| 2003/0154227 A1 | 8/2003 | Howard et al. |
| 2004/0039954 A1 | 2/2004 | White et al. |
| 2004/0042458 A1 | 3/2004 | Elzu |
| 2004/0042483 A1 | 3/2004 | Elzur et al. |
| 2004/0055464 A1 | 3/2004 | Lamprecht et al. |
| 2005/0165985 A1 | 7/2005 | Vangal et al. |
| 2005/0226238 A1 | 10/2005 | Hoskote et al. |
| 2005/0286655 A1 | 12/2005 | Narendra et al. |

FOREIGN PATENT DOCUMENTS

| | | |
|---|---|---|
| JP | 09-064843 | 3/1997 |

OTHER PUBLICATIONS

Altera, Increasing System Bandwidth With CDS, Version 1, Jun. 2001, pp. 1-10.
Alacritech, Aug. 2002.
Broadcom, Dec. 21, 2000.
Boon Ang, An Evalation of an Attempt at Offloading TCP/IP Protocol Processing onto an i960RN-based iNIC, HP Laboratories, Jan. 9, 2001.
Information Sciences Institute, Transmission Control Protocol Darpa Internet Program, Sep. 1981.
R Braden, Requirements for Internet Hosts—Communication Layers, Network Working Group, Oct. 1989.
V Jacobson, et al., TCP Extensions for High Performance, Network Working Group, May 1992.
Silverback iSNAP 2100, 2002.
Alacritech, 2000.
Trebia Networks, Oct. 2002.
Optistar GE1000, Lucent Technologies, Jun. 18, 2001.
R. Braden, Internet Engineering Task Force, "Requirements for Internet Hosts—Communication Layers", Network Working Group Request for Comments:1122, pp. 1-116.
"Transmission Control Protocol Darpa Internet Program Protocol Specification", Sep. 1981, RFC: 793, Information Sciences Institute University of Southern California, Marina del rey, California, 89 Pgs.
V. Jacobson, et al., "TCP Extensions for High Performance", Network Working Group Request for Comments: 1323, Obsoletes: RFC 1072, RFC 1185, pp. 1-37.
"Accelerating Server and Application Performance", The next Generation at Network Connecitvity, 2000 Alacritech, www.alacritech.com, info@alacritech.com, 14 Pgs.
"ANA-7711 TCP/IP Offload Adapter", 2 Pgs.
BCM5700 Software Suite Product Brief, Broadcom, BCM5700 10/100/1000 PCI-X Controller Software Suite, 2000 by Broadcom Corporation, 2 Pgs.
Boon s. Ang., "An Evaluation of an Attempt at Offloading TCP/IP Protocol Processing onto an i960RN-based iNIC", 2001 Hewlett Packard, TCP/IP Networking, Intelligent Network Interface, 33 Pgs.
"Optistar GE1000 With Transport Acceleration", High Performance Gigabit Ethernet Network Adapter Featuring Full Transport Protocol Offload, 2001 Lucent Technologies Inc., 2 Pgs.
"Alacritech 1000x1 Gigabit Adapter, Toe-and iSCSI-Ready", The Acceleratiiong Convergence of Networking and storage, 2002 Alacritech, 2 Pgs.
"Silverback iSNAP 2100 IP Storage Network Access Processor", 2002 Silverback Systems, 2 Pgs.
"SNP-1000i Dual Port TCP Offload Engine", 2002 Trebia Networks, 2 Pgs.
CPEL0353169 First Chinese Office Action.
PCT/US03/27265 Written Opinion dated Oct. 29, 2004.
Internet Protocol, DARPA Internet Program, Protocol Specification, rfc0791, Information Sciences Institute, University of Souther California, US, Sep. 1981, 46 pages.
Alacritech 1000x2 Gigabit Adapter; 2002; 2 pages.
Intel Being Licensed for TOE Technology.

* cited by examiner

| Instruction | Operands |
|---|---|
| LOAD | regA <-- data |
| MOV | regA --> regB |
| AND / OR | regA regB --> cond |
| ADD / SUB | regA regB --> regC |
| CMP / EQUAL | regA regB --> cond |
| NOT | regA --> regC |
| BREQZ/BRNEQZ/JMP | label |
| SHL2 | regA |
| CAM1CLR | index |
| TCBWR | index |

FIG. 4

NETWORK PROTOCOL ENGINE

REFERENCES TO RELATED APPLICATIONS

This application relates to the following co-pending applications: "PACKET-BASED CLOCK SIGNAL", Ser. No. 10/234489; and "TRACKING OUT-OF-ORDER PACKETS", Ser. No. 10/234489. These applications were filed on the same day as the present application and name the same inventors.

REFERENCE TO APPENDIX

This application includes an appendix, Appendix A, of micro-code instructions. The authors retain applicable copyright rights in this material.

BACKGROUND

Networks enable computers and other electronic devices to exchange data such as e-mail messages, web pages, audio data, video data, and so forth. Before transmission across a network, data is typically distributed across a collection of packets. A receiver can reassemble the data back into its original form after receiving the packets.

In addition to the data ("payload") being sent, a packet also includes "header" information. A network protocol can define the information stored in the header, the packet's structure, and how processes should handle the packet.

Different network protocols handle different aspects of network communication. Many network communication models organize these protocols into different layers. For example, models such as the Transmission Control Protocol/Internet Protocol (TCP/IP) model and the Open Software Institute (OSI) model define a "physical layer" that handles bit-level transmission over physical media; a "link layer" that handles the low-level details of providing reliable data communication over physical connections; a "network layer", such as the Internet Protocol, that can handle tasks involved in finding a path through a network that connects a source and destination; and a "transport layer" that can coordinate communication between source and destination devices while insulating "application layer" programs from the complexity of network communication.

A different network communication model, the Asynchronous Transfer Mode (ATM) model, is used in ATM networks. The ATM model also defines a physical layer, but defines ATM and ATM Adaption Layer (AAL) layers in place of the network, transport, and application layers of the TCP/IP and OSI models.

Generally, to send data over the network, different headers are generated for the different communication layers. For example, in TCP/IP, a transport layer process generates a transport layer packet (sometimes referred to as a "segment") by adding a transport layer header to a set of data provided by an application; a network layer process then generates a network layer packet (e.g., an IP packet) by adding a network layer header to the transport layer packet; a link layer process then generates a link layer packet (also known as a "frame") by adding a link layer header to the network packet; and so on. This process is known as encapsulation. By analogy, the process of encapsulation is much like stuffing a series of envelopes inside one another.

After the packet(s) travel across the network, the receiver can de-encapsulate the packet(s) (e.g,. "unstuff" the envelopes). For example, the receiver's link layer process can verify the received frame and pass the enclosed network layer packet to the network layer process. The network layer process can use the network header to verify proper delivery of the packet and pass the enclosed transport segment to the transport layer process. Finally, the transport layer process can process the transport packet based on the transport header and pass the resulting data to an application.

As described above, both senders and receivers have quite a bit of processing to do to handle packets. Additionally, network connection speeds continue to increase rapidly. For example, network connections capable of carrying 10-gigabits per second and faster may soon become commonplace. This increase in network connection speeds imposes an important design issue for devices offering such connections. That is, at such speeds, a device may easily become overwhelmed with a deluge of network traffic.

BRIEF DESCRIPTION OF THE DRAWINGS

FIG. 4 is a chart of an instruction set for programming network protocol operations.

DETAILED DESCRIPTION

Figure 1:
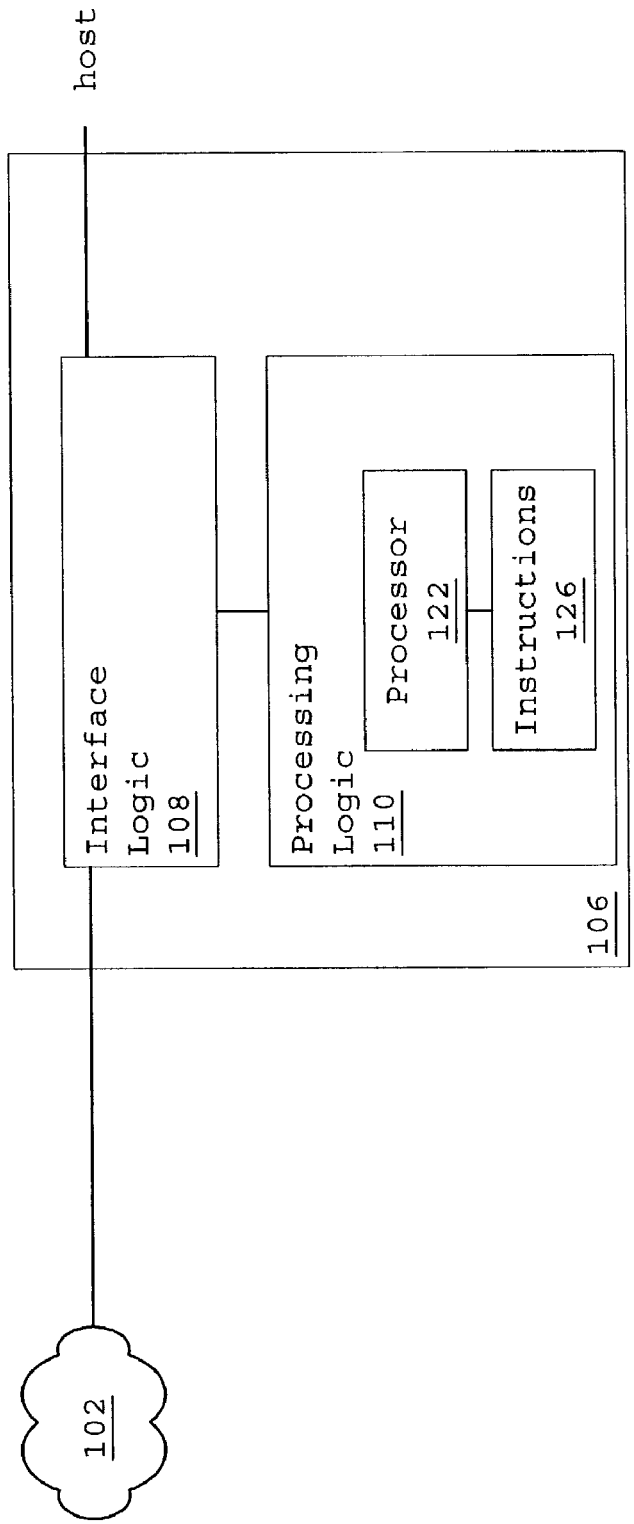
FIG. 1 is a block diagram of a network protocol engine.

Many computer systems and other host devices feature processors (e.g., general purpose Central Processing Units (CPUs)) that handle a wide variety of tasks. Often these processors have the added responsibility of handling network traffic. The increases in network traffic and connection speeds have placed growing demands on host processor resources. To at least partially reduce the burden of network communication on a host processor, FIG. 1 depicts an example of a network protocol "off-load" engine 106 that can perform network protocol operations for a host. The system 106 can perform operations for a wide variety of protocols. For example, the system can be configured to perform operations for transport layer protocols (e.g., TCP and User Datagram Protocol (UDP)), network layer protocols (e.g., IP), and application layer protocols (e.g., sockets programming). Similarly, in ATM networks, the system 106 can be configured to provide ATM layer or AAL layer operations for ATM packets (also referred to as "cells"). The system can be configured to provide other protocol operations such as those associated with the Internet Control Message Protocol (ICMP).

In addition to conserving host processor resources by handling protocol operations, the system 106 may provide "wire-speed" processing, even for very fast connections such as 10-gigabit per second and 40-gigabit per second connections. In other words, the system 106 may, generally, complete processing of one packet before another arrives. By keeping pace with a high-speed connection, the system 106 can potentially avoid or reduce the cost and complexity associated with queuing large volumes of backlogged packets.

The sample system 106 shown includes an interface 108 for receiving data traveling between one or more hosts and a network 102. For out-going data, the system 106 interface 108 receives data from the host(s) and generates packets for network transmission, for example, via a PHY and medium access control (MAC) device (not shown) offering a network connection (e.g., an Ethernet or wireless connection). For received packets (e.g., packets received via the PHY and MAC), the system 106 interface 108 can deliver the results of packet processing to the host(s). For example, the system 106 may communicate with a host via a Small Computer System Interface (SCSI) or Peripheral Component Interconnect (PCI) type bus (e.g., a PCI-X bus system).

In addition to the interface 108, the system 106 also includes processing logic 110 that implements protocol operations. Like the interface 108, the logic 110 may be designed using a wide variety of techniques. For example, the system 106 may be designed as a hard-wired ASIC (Application Specific Integrated Circuit), a FPGA (Field Programmable Gate Array), and/or as another combination of digital logic gates.

As shown, the logic 110 may also be implemented by a system 106 that includes a processor 122 (e.g., a microcontroller or micro-processor) and storage 126 (e.g., ROM (Read-Only Memory) or RAM (Random Access Memory)) for instructions that the processor 122 can execute to perform network protocol operations. The instruction-based system 106 offers a high degree of flexibility. For example, as a network protocol undergoes changes or is replaced, the system 106 can be updated by replacing the instructions instead of replacing the system 106 itself. For example, a host may update the system 106 by loading instructions into storage 126 from external FLASH memory or ROM on the motherboard, for instance, when the host boots.

Though FIG. 1 depicts a single system 106 performing operations for a host, a number of off-load engines 106 may be used to handle network operations for a host to provide a scalable approach to handling increasing traffic. For example, a system may include a collection of engines 106 and logic for allocating connections to different engines 106. To conserve power, such allocation may be performed to reduce the number of engines 106 actively supporting on-going connections at a given time.

Figure 2:
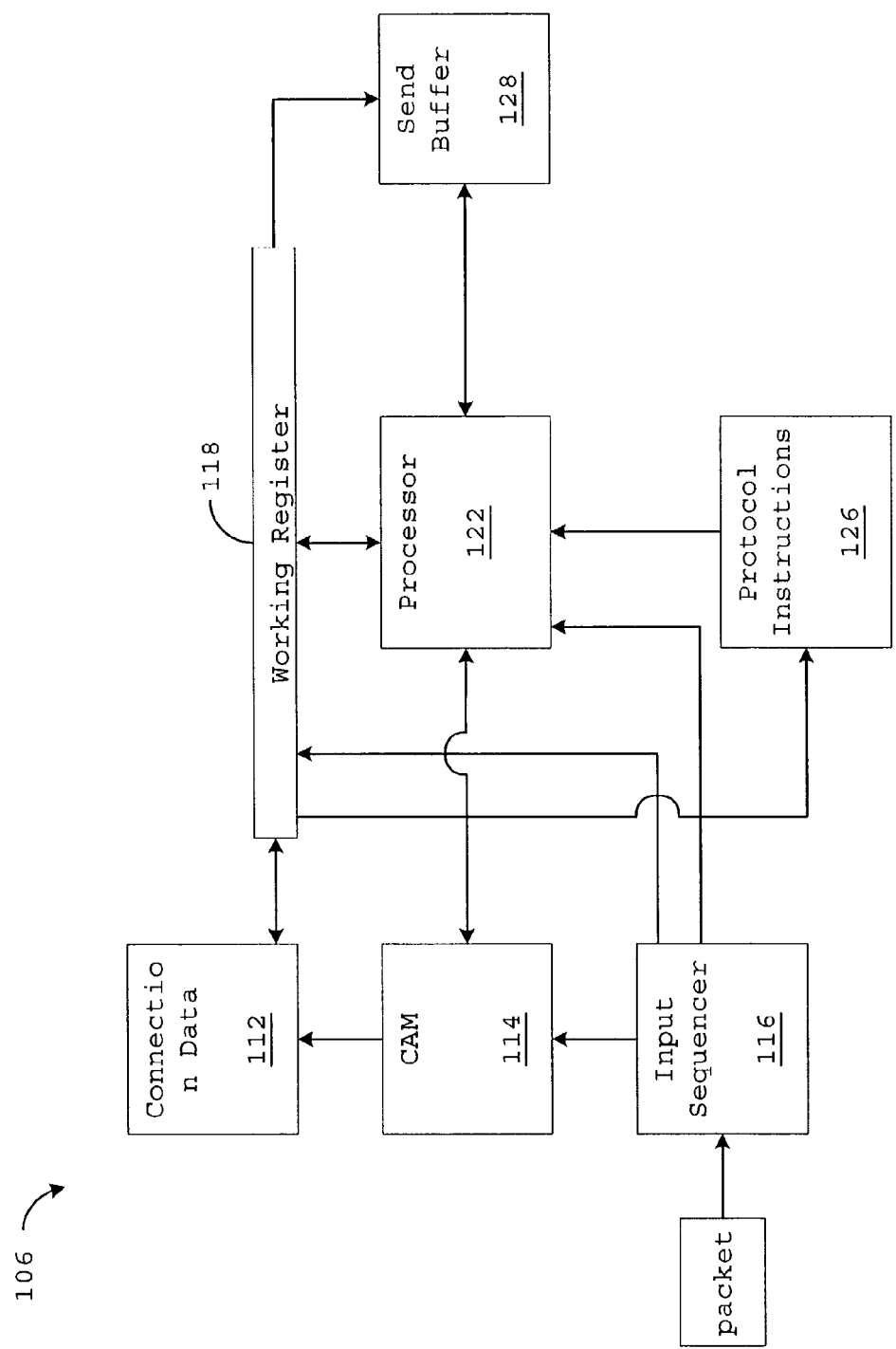
FIG. 2 is a schematic of a network protocol engine.

FIG. 2 depicts a sample implementation of a system 106. As an overview, in this implementation, the system 106 stores context data for different connections in a memory 112. For example, for the TCP protocol, this data is known as TCB (Transmission Control Block) data. For a given packet, the system 106 looks-up the corresponding connection context in memory 112 and makes this data available to the processor 122, in this example, via a working register 118. Using the context data, the processor 122 executes an appropriate set of protocol implementation instructions 126. Context data, potentially modified by the processor 122, is then returned to the context memory 112.

In greater detail, the system 106 shown includes an input sequencer 116 that parses a received packet's header(s) (e.g., the TCP and IP headers of a TCP/IP packet) and temporarily buffers the parsed data. The input sequencer 116 may also initiate storage of the packet's payload in host accessible memory (e.g., via DMA (Direct Memory Access)). As described below, the input sequencer 116 may be clocked at a rate corresponding to the speed of the network connection.

As described above, the system 106 stores context data 112 for different network connections. To quickly retrieve context data from memory 112 for a given packet, the system 106 depicted includes a content-addressable memory 114 (CAM) that stores different connection identifiers (e.g., index numbers) for different connections as identified, for example, by a combination of a packet's IP source and destination addresses and source and destination ports. A CAM can quickly retrieve stored data based on content values much in the way a database can retrieve records based on a key. Thus, based on the packet data parsed by the input sequencer 116, the CAM 114 can quickly retrieve a connection identifier and feed this identifier to the context data memory 112. In turn, the connection context data corresponding to the identifier is transferred from the memory 112 to the working register 118 for use by the processor 122.

In the case that a packet represents the start of a new connection (e.g., a CAM 114 search for a connection fails), the working register 118 is initialized (e.g., set to the "LISTEN" state in TCP) and CAM 114 and a context data 112 entries are allocated for the connection, for example, using a LRU (Least Recently Used) algorithm or other allocation scheme.

The number of data lines connecting different components of the system 106 may be chosen to permit data transfer between connected components 112–128 in a single clock cycle. For example, if the context data for a connection includes n-bits of data, the system 106 may be designed such that the connection data memory 112 may offer n-lines of data to the working register 118.

Thus, the sample implementation shown uses at most three processing cycles to load the working register 118 with connection data: one cycle to query the CAM 114; one cycle to access the connection data 112; and one cycle to load the working register 118. This design can both conserve processing time and economize on power-consuming access to the memory structures 112, 114.

After retrieval of connection data for a packet, the system 106 can perform protocol operations for the packet, for example, by processor 122 execution of protocol implementation instructions stored in memory 126. The processor 122 may be programmed to "idle" when not in use to conserve power. After receiving a "wake" signal (e.g., from the input sequencer 116 when the connection context is retrieved or being retrieved), the processor 122 may determine the state of the current connection and identify the starting address of instructions for handling this state. The processor 122 then executes the instructions beginning at the starting address. Depending on the instructions, the processor 122 can alter context data (e.g., by altering working register 118), assemble a message in a send buffer 128 for subsequent network transmission, and/or may make processed packet data available to the host (not shown). Again, context data, potentially modified by the processor 122, is returned to the context data memory 112.

Figure 3:
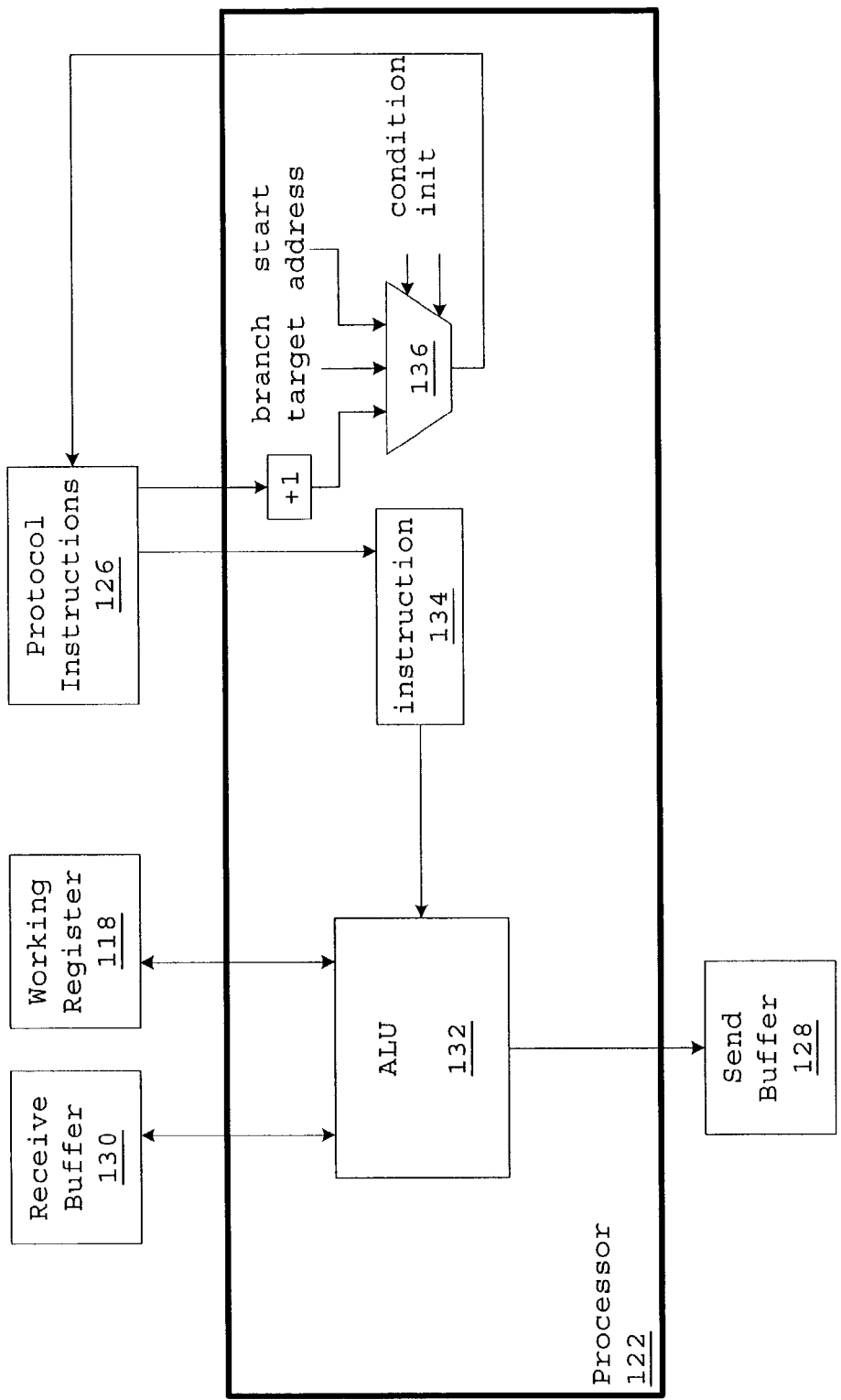
FIG. 3 is a schematic of a processor of a network protocol engine.

FIG. 3 depicts the processor 122 in greater detail. As shown, the processor 122 may include an ALU (arithmetic logic unit) 132 that decodes and executes micro-code instructions loaded into an instruction register 134. The instructions 126 may be loaded 136 into the instruction register 134 from memory 126 in sequential succession with exceptions for branching instructions and start address initialization. The instructions 126 may specify access (e.g., read or write access) to a receive buffer 130 that stores the parsed packet data, the working register 118, the send buffer 128, and/or host memory (not shown). The instructions may also specify access to scratch memory, miscellaneous registers (e.g., registers dubbed R0, cond, and statusok), shift registers, and so forth (not shown). For programming convenience, the different fields of the send buffer 128 and working register 118 may be assigned labels for use in the instructions. Additionally, various constants may be defined, for example, for different connection states. For example, "LOAD TCB[state], LISTEN" instructs the processor 122 to change the state of the connection context state in the working register 118 to the "LISTEN" state.

FIG. 4 depicts an example of a micro-code instruction set that can be used to program the processor to perform protocol operations. As shown, the instruction set includes operations that move data within the system (e.g., LOAD and MOV), perform mathematic and Boolean operations (e.g., AND, OR, NOT, ADD, SUB), compare data (e.g., CMP and EQUAL), manipulate data (e.g., SHL (shift left)), and provide branching within a program (e.g., BREQZ (conditionally branch if the result of previous operation equals zero), BRNEQZ (conditionally branch if result of previous operation does not equal zero), and JMP (unconditionally jump)).

The instruction set also includes operations specifically tailored for use in implementing protocol operations with system 106 resources. These instructions include operations for clearing the CAM 114 of an entry for a connection (e.g., CAM1CLR) and for saving context data to the context data storage 112 (e.g., TCBWR). Other implementations may also include instructions that read and write identifier information to the CAM 114 storing data associated with a connection (e.g., CAM1READ key-->index and CAM1WRITE key-->index) and an instruction that reads the context data 112 (e.g., TCBRD index-->destination). Alternately, these instructions may be implemented as hardwired logic.

Though potentially lacking many instructions offered by traditional general purpose CPUs (e.g., processor 122 may not feature instructions for floating-point operations), the instruction set provides developers with easy access to system 106 resources tailored for network protocol implementation. A programmer may directly program protocol operations using the micro-code instructions. Alternately, the programmer may use a wide variety of code development tools (e.g., a compiler or assembler).

As described above, the system 106 instructions can implement operations for a wide variety of network protocols. For example, the system 106 may implement operations for a transport layer protocol such as TCP. A complete specification of TCP and optional extensions can be found in RFCs (Request for Comments) 793, 1122, and 1323.

Briefly, TCP provides connection-oriented services to applications. That is, much like picking up a telephone and assuming the phone company will make everything work, TCP provides applications with simple primitives for establishing a connection (e.g., CONNECT and CLOSE) and transferring data (e.g., SEND and RECEIVE). TCP transparently handles communication issues such as data retransmission, congestion, and flow control.

To provide these services to applications, TCP operates on packets known as segments. A TCP segment includes a TCP header followed by one or more data bytes. A receiver can reassemble the data from received segments. Segments may not arrive at their destination in their proper order, if at all. For example, different segments may travel very different paths across a network. Thus, TCP assigns a sequence number to each data byte transmitted. Since every byte is sequenced, each byte can be acknowledged to confirm successful transmission. The acknowledgment mechanism is cumulative so that an acknowledgment of a particular sequence number indicates that bytes up to that sequence number have been successfully delivered.

The sequencing scheme provides TCP with a powerful tool for managing connections. For example, TCP can determine when a sender should retransmit a segment using a technique known as a "sliding window". In the "sliding window" scheme, a sender starts a timer after transmitting a segment. Upon receipt, the receiver sends back an acknowledgment segment having an acknowledgement number equal to the next sequence number the receiver expects to receive. If the sender's timer expires before the acknowledgment of the transmitted bytes arrives, the sender transmits the segment again. The sequencing scheme also enables senders and receivers to dynamically negotiate a window size that regulates the amount of data sent to the receiver based on network performance and the capabilities of the sender and receiver.

In addition to sequencing information, a TCP header includes a collection of flags that enable a sender and receiver to control a connection. These flags include a SYN (synchronize) bit, an ACK (acknowledgement) bit, a FIN (finish) bit, a RST (reset) bit. A message including a SYN bit of "1" and an ACK bit of "0" (a SYN message) represents a request for a connection. A reply message including a SYN bit "1" and an ACK bit of "1" (a SYN+ACK message) represents acceptance of the request. A message including a FIN bit of "1" indicates that the sender seeks to release the connection. Finally, a message with a RST bit of "1" identifies a connection that should be terminated due to problems (e.g., an invalid segment or connection request rejection).

Figure 5:
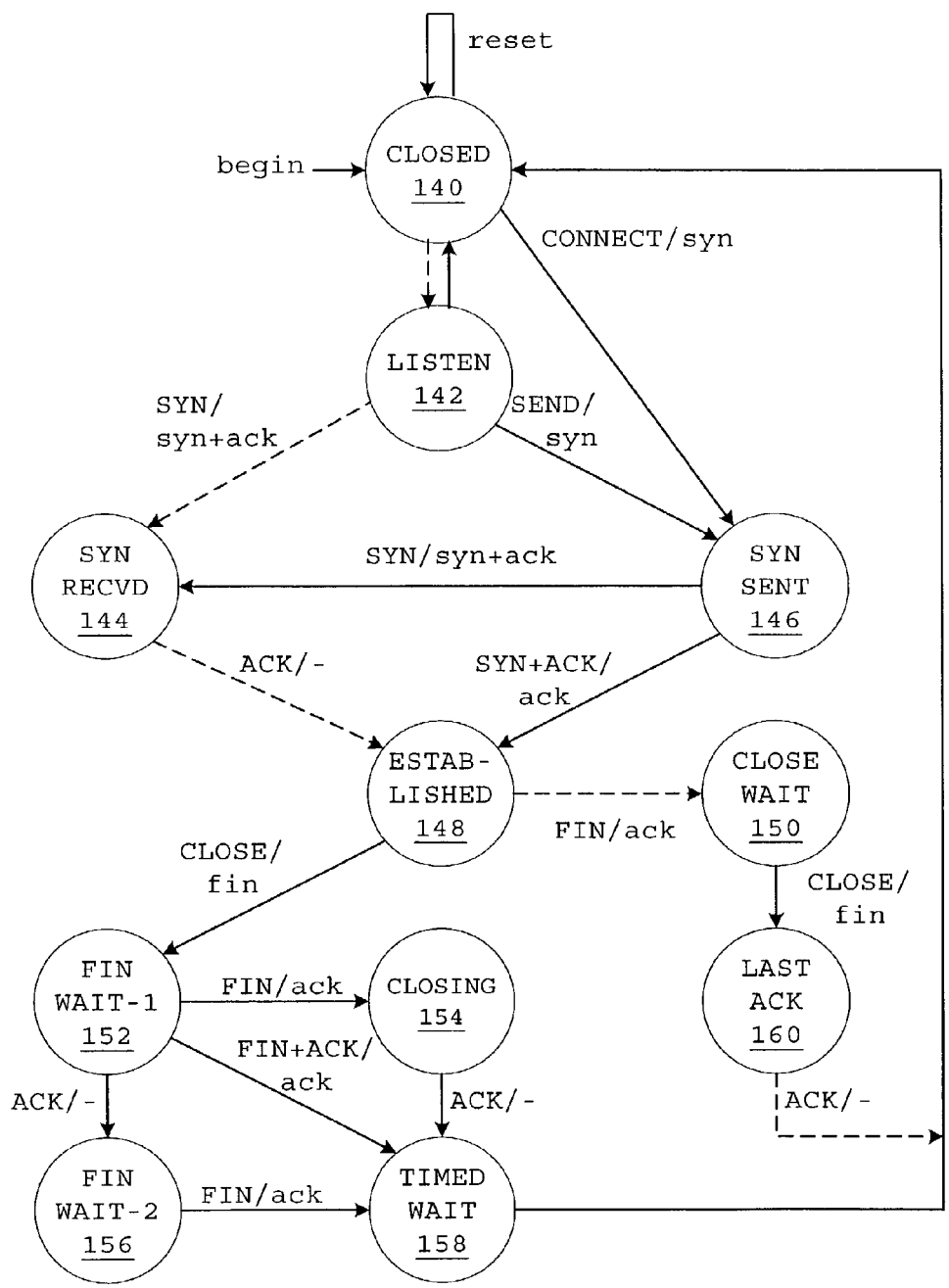
FIG. 5 is a diagram of a TCP (Transmission Control Protocol) state machine.

FIG. 5 depicts a state diagram representing different stages in the establishment and release of a TCP connection. The diagram depicts different states 140–160 and transitions (depicted as arrowed lines) between the states 140–160. The transitions are labeled with corresponding event/action designations that identify an event and an action required to move to a subsequent state 140–160. For example, after receiving a SYN message and responding with a SYN+ACK message, a connection moves from the LISTEN state 142 to the SYN RCVD state 144.

In the state diagram of FIG. 5, the typical path for a sender (a TCP entity requesting a connection) is shown with solid transitions while the typical paths for a receiver is shown with dotted line transitions. To illustrate operation of the state machine, a receiver typically begins in the CLOSED state 140 that indicates no connection is currently active or pending. After moving to the LISTEN 142 state to await a connection request, the receiver will receive a SYN message requesting a connection and will acknowledge the SYN message with a SYN+ACK message and enter the SYN RCVD state 144. After receiving acknowledgement of the SYN+ACK message, the connection enters an ESTABLISHED state 148 that corresponds to normal on-going data transfer. The ESTABLISHED state 148 may continue for some time. Eventually, assuming no reset message arrives and no errors occur, the server will receive and acknowledge a FIN message and enter the CLOSE WAIT state 150. After issuing its own FIN and entering the LAST ACK state 160, the server will receive acknowledgment of its FIN and finally return to the original CLOSED 140 state.

Again, the state diagram also manages the state of a TCP sender. The sender and receiver paths share many of the same states described above. However, the sender may also enter a SYN SENT state 146 after requesting a connection, a FIN WAIT 1 state 152 after requesting release of a connection, a FIN WAIT 2 state 156 after receiving an agreement from the receiver to release a connection, a CLOSING state 154 where both sender and receiver request release simultaneously, and a TIMED WAIT state 158 where previously transmitted connection segments expire.

The system's 106 protocol instructions may implement many, if not all, of the TCP operations described above and in the RFCs. For example, the instructions may include procedures for option processing, window management, flow control, congestion control, ACK message generation and validation, data segmentation, special flag processing (e.g., setting and reading URGENT and PUSH flags), checksum computation, and so forth. The protocol instructions may also include other operations related to TCP such as security support, random number generation, RDMA (Remote Direct Memory Access) over TCP, and so forth.

In a system 106 configured to provide TCP operations, the context data may include 264-bits of information per connection including: 32-bits each for PUSH (identified by the micro-code label "TCB[pushseq]"), FIN ("TCB[finseq]"), and URGENT ("TCB[rupseq]") sequence numbers, a next expected segment number ("TCB[rnext]"), a sequence number for the currently advertised window ("TCB[cwin]"), a sequence number of the last unacknowledged sequence number ("TCB[suna]"), and a sequence number for the next segment to be next ("TCB[snext]"). The remaining bits store various TCB state flags ("TCB[flags]"), TCP segment code ("TCB[code]"), state ("TCB[tcbstate]"), and error flags ("TCB[error]"), To illustrate programming for a system 106 configured to perform TCP operations, Appendix A features an example of source micro-code for a TCP receiver. Briefly, the routine TCPRST checks the TCP ACK bit, initializes the send buffer, and initializes the send message ACK number. The routine TCPACKIN processes incoming ACK messages and checks if the ACK is invalid or a duplicate. TCPACKOUT generates ACK messages in response to an incoming message based on received and expected sequence numbers. TCPSEQ determines the first and last sequence number of incoming data, computes the size of incoming data, and checks if the incoming sequence number is valid and lies within a receiving window. TCPINITCB initializes TCB fields in the working register. TCPINITWIN initializes the working register with window information. TCPSENDWIN computes the window length for inclusion in a send message. Finally, TCBDATAPROC checks incoming flags, processes "urgent", "push" and "finish" flags, sets flags in response messages, and forwards data to an application or user Another operation performed by the system 106 may be packet reordering. For example, like many network protocols, TCP does not assume TCP packets ("segments") will arrive in order. To correctly reassemble packets, a receiver can keep track of the last sequence number received and await reception of the byte assigned the next sequence number. Packets arriving out-of-order can be buffered until the intervening bytes arrive. Once the awaited bytes arrive, the next bytes in the sequence can potentially be retrieved quickly from the buffered data.

FIGS. 6–10 illustrate operation of a scheme to track out-of-order packets that can be implemented by the system 106. The scheme permits quick "on-the-fly" ordering of packets without employing a traditional sorting algorithm. The scheme may be implemented using another set of content-addressable memory 510, 512, though this is not a requirement. Thus, a system 106 using this technique may include two different sets of content-addressable memory— the content-addressable memory 114 used to retrieve connection context data and the content-addressable memory used to track out-of-order packets.

For the purposes of illustration, FIGS. 6–10 are discussed in the context of an implementation of TCP. However, the scheme has wide applicability to a variety of packet reordering schemes such as numbered packets (e.g., protocol data unit fragments). Thus, while the description below discusses storage of TCP sequence numbers, an embodiment for numbered packets can, instead, store packet numbers.

Briefly, when a packet arrives, a packet tracking subsystem determines whether the received packet is in-order. If not, the sub-system consults memory to identify a contiguous set of previously received out-of-order packets bordering the newly arrived packet and can modify the data stored in the memory to add the packet to the set. When a packet arrives in-order, the sub-system can access the memory to quickly identify a contiguous chain of previously received packets that follow the newly received packet.

Figure 6:
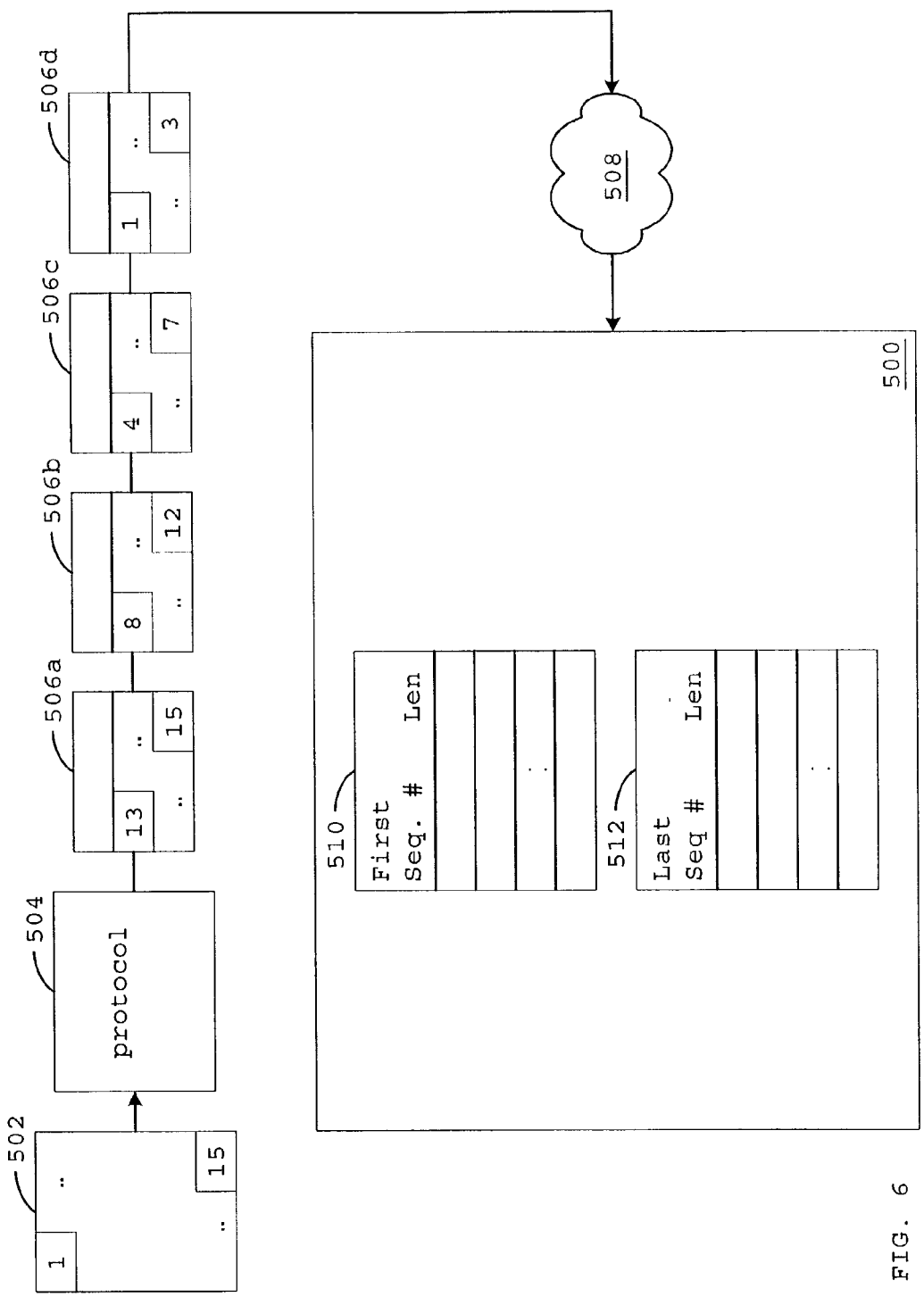
FIGS. 6–10 illustrate operation of a scheme to track out-of-order packets.

In greater detail, as shown in FIG. 6, a protocol 504 (e.g., TCP) divides a set of data 502 into a collection of packets 506a–506d for transmission over a network 508. In the example shown, 15-bytes of an original set of data 502 are distributed across the packets 506a–506d. For example, packet 506d includes bytes assigned sequence numbers "1" to "3".

As shown, the tracking sub-system 500 includes content-addressable memory 510, 512 that stores information about received, out-of-order packets. Memory 510 stores the first sequence number of a contiguous chain of one or more out-of-order packets and the length of the chain. Thus, when a new packet arrives that ends where the pre-existing chain begins, the new packet can be added to the top of the pre-existing chain. Similarly, the memory 512 also stores the end (the last sequence number+1) of a contiguous packet chain of one or more packets and the length of the chain. Thus, when a new packet arrives that begins at the end of a previously existing chain, the new packet can be appended to the end of the previously existing chain to form an even larger chain of contiguous packets. To illustrate these operations, FIGS. 7–10 depict a sample series of operations that occur as the packets 506a–506d arrive.

Figure 7:
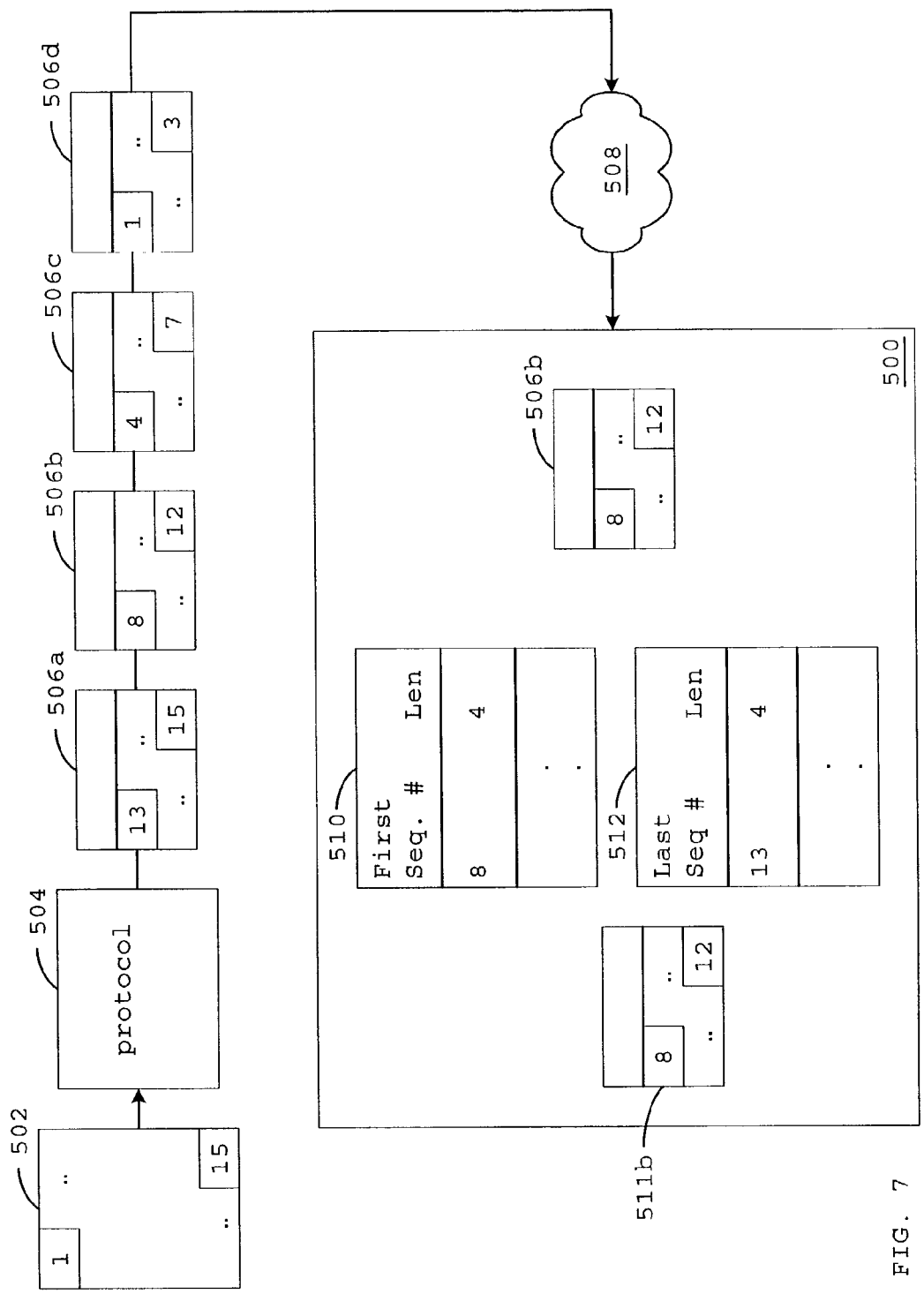

As shown in FIG. 7, packet 506b arrives carrying bytes with sequence numbers "8" through "12". Assuming the sub-system 500 currently awaits sequence number "1", packet 506b has arrived out-of-order. Thus, as shown, the device 500 tracks the out-of-order packet 506b by modifying data stored in its content-addressable memory 510, 512. The packet 506b does not border a previously received packet chain as no chain yet exists in this example. Thus, the sub-system 500 stores the starting sequence number, "8", and the number of bytes in the packet, "4". The sub-system 500 also stores identification of the end of the packet. In the example shown, the device 500 stores the ending boundary by adding one to the last sequence number of the received packet (e.g., 12+1=13). In addition to modifying or adding entries in the content-addressable memory 510, 512, the device 500 can store the packet or a reference (e.g., a pointer) to the packet 511b to reflect the relative order of the packet. This permits fast retrieval of the packets when finally sent to an application.

Figure 8:
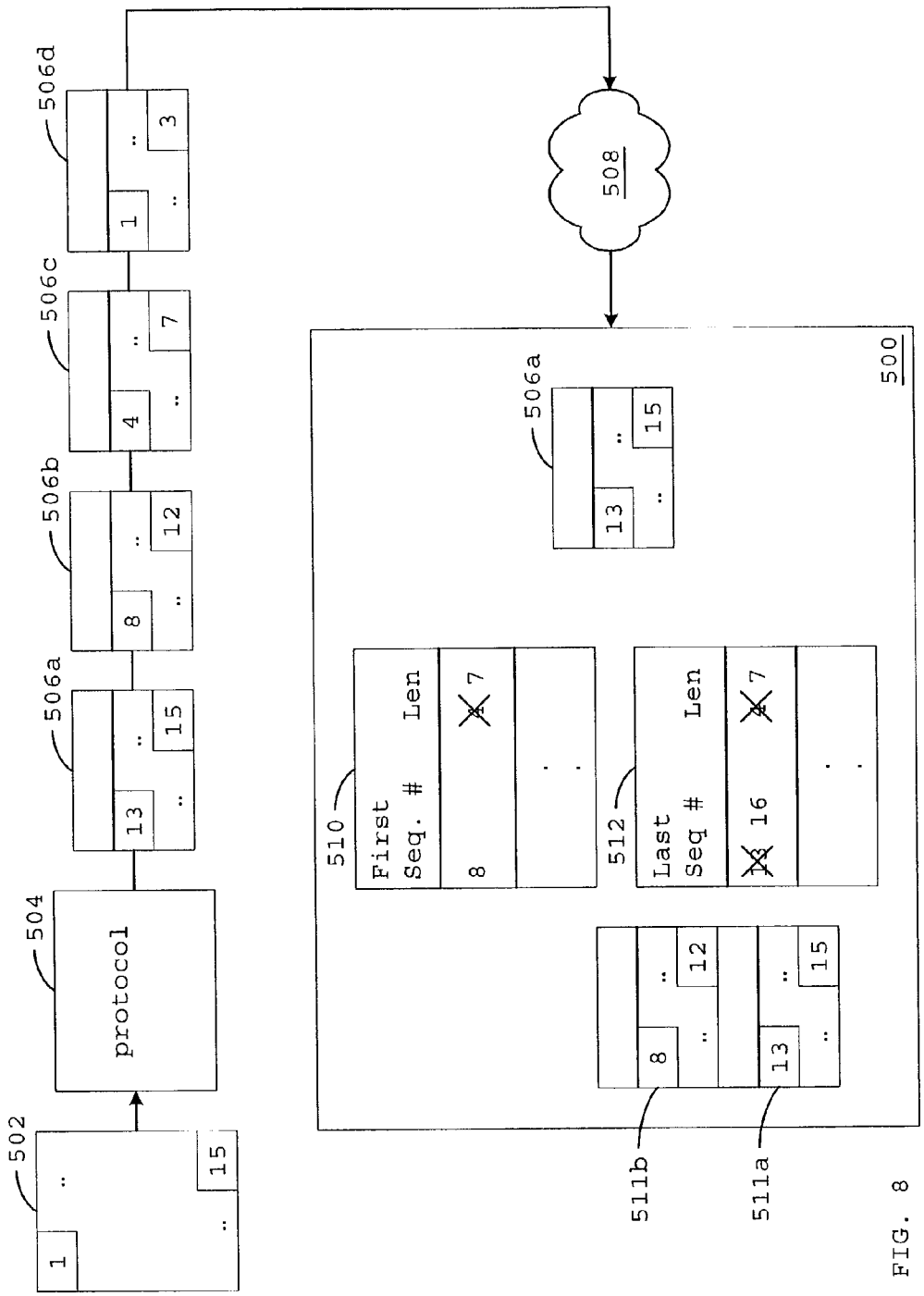

As shown in FIG. 8, the sub-system 500 next receives packet 506a carrying bytes "13" through "15". Again, the sub-system 500 still awaits sequence number "1". Thus, packet 506a has also arrived out-of-order. The sub-system 500 examines memory 510, 512 to determine whether the received packet 506a borders any previously stored packet chains. In this case, the newly arrived packet 506a does not end where a previous chain begins, but does begin where a previous chain ends. In other words, packet 506a borders the "bottom" of packet 506b. As shown, the device 500 can merge the packet 506a into the pre-existing chain in the content-addressable memory data by increasing the length of the chain and modifying its first and last sequence number data accordingly. Thus, the first sequence number of the new chain remains "8" though the length is increased from "4" to "7", while the end sequence number of the chain is increased from "13" to "16" to reflect the bytes of the newly received packet 506a. The device 500 also stores the new packet 511a or a reference to the new packet to reflect the relative ordering of the packet.

Figure 9:
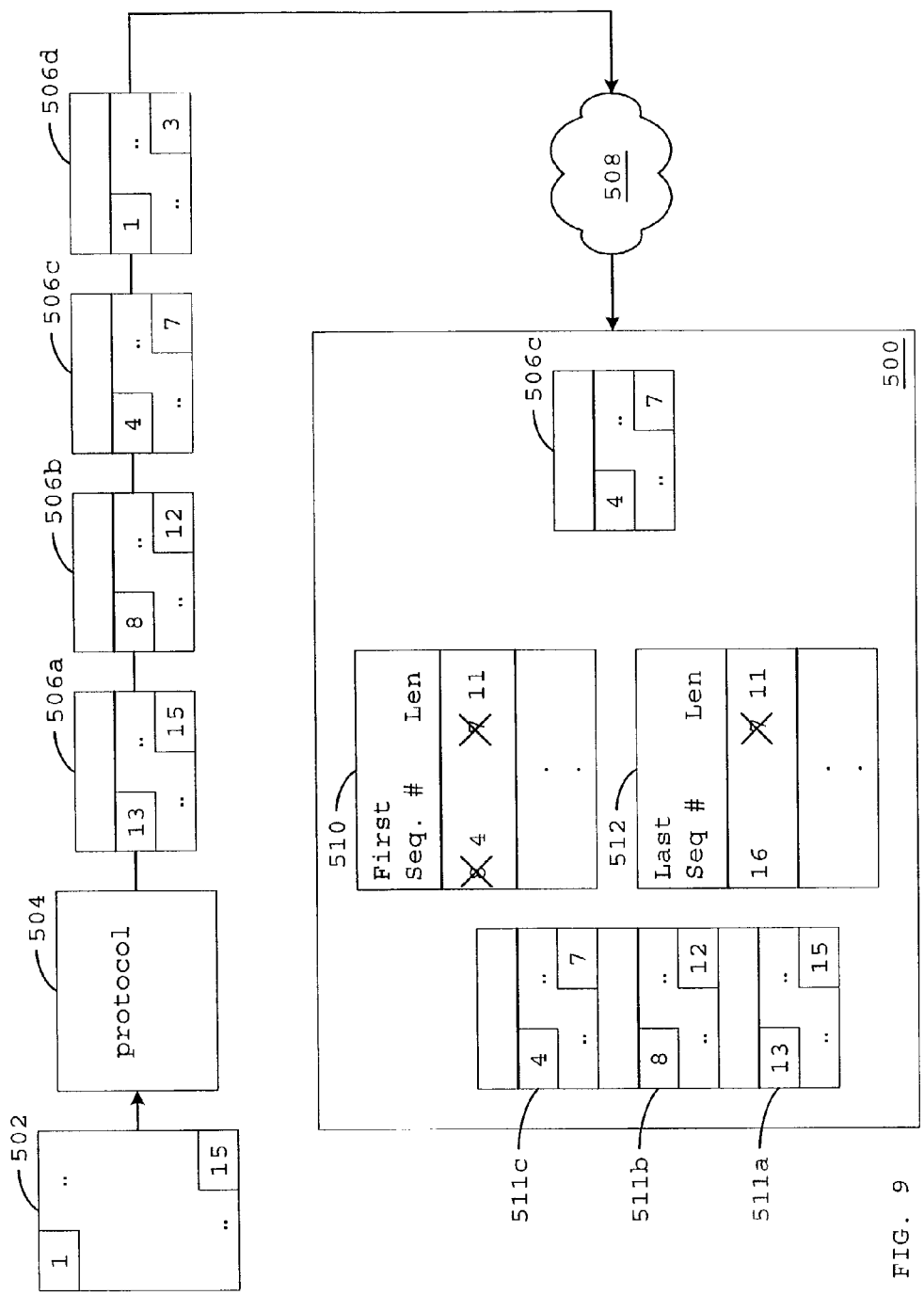

As shown in FIG. 9, the device 500 next receives packet 506c carrying bytes "4" to "7". Since this packet 506c does not include the next expected sequence number, "1", the device 500 repeats the process outlined above. That is, the device 500 determines that the newly received packet 506c fits "atop" the packet chain spanning packets 506b, 506a. Thus, the device 500 modifies the data stored in the content-addressable memory 510, 512 to include a new starting sequence number for the chain, "4", and a new length data for the chain, "11". The device 500 again stores a reference to the packet 511c data to reflect the packet's 511c relative ordering.

Figure 10:
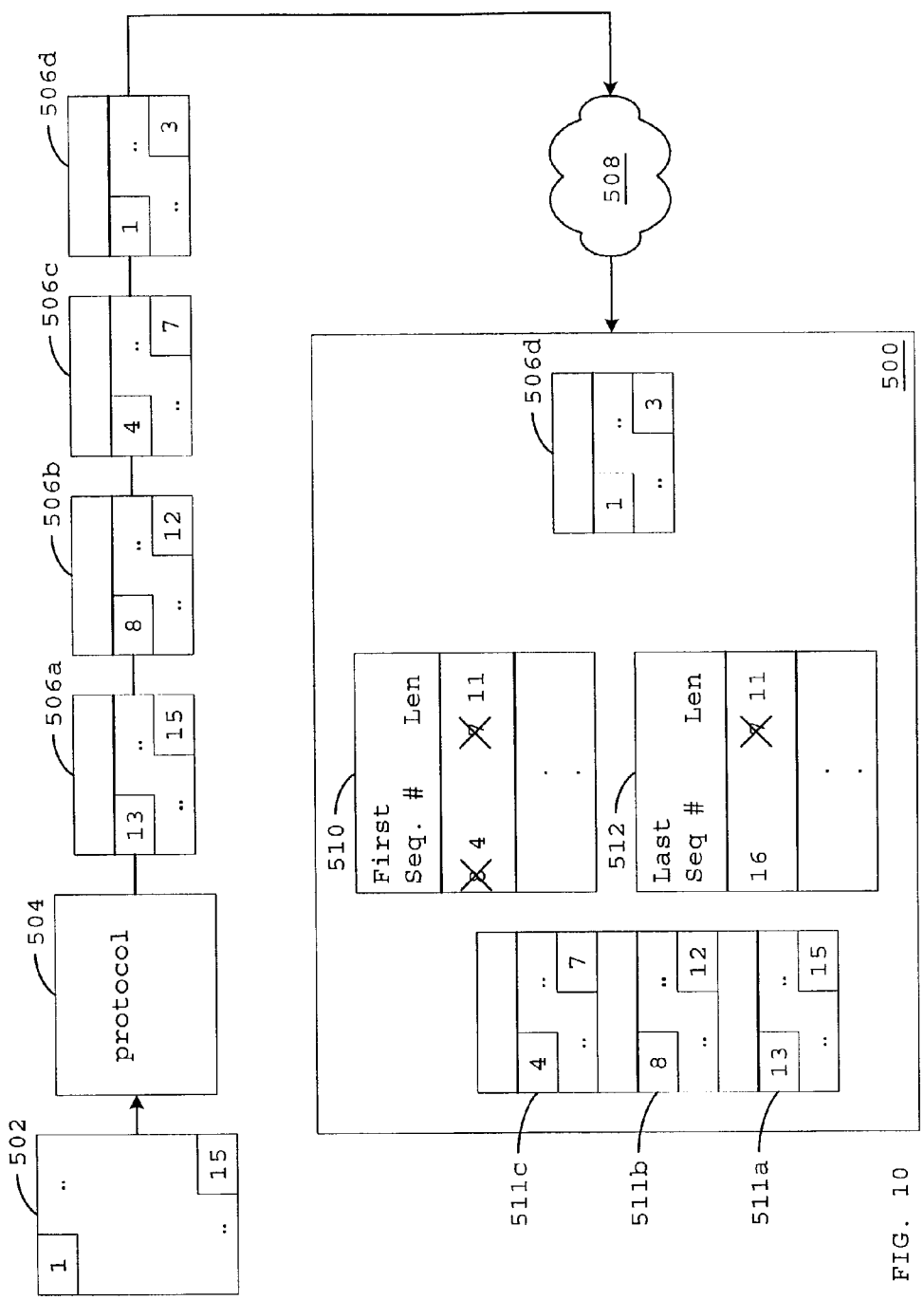

As shown in FIG. 10, the device 500 finally receives packet 506d that includes the next expected sequence number, "1". The device 500 can immediately transfer this packet 506d to an application. The device 500 can also examine its content-addressable memory 510 to see if other packets can also be sent to the application. In this case, the received packet 506d borders a packet chain that already spans packets 506a–506c. Thus, the device 500 can immediately forward the data of chained packets to the application in the correct order.

The sample series shown in FIGS. 7–10 highlights several aspects of the scheme. First, the scheme may prevent out-of-order packets from being dropped and being retransmitted by the sender. This can improve overall throughput. The scheme also uses very few content-addressable memory operations to handle out-of-order packets, saving both time and power. Further, when a packet arrives in the correct order, a single content-addressable memory operation can identify a series of contiguous packets that can also be sent to the application.

Figure 11:
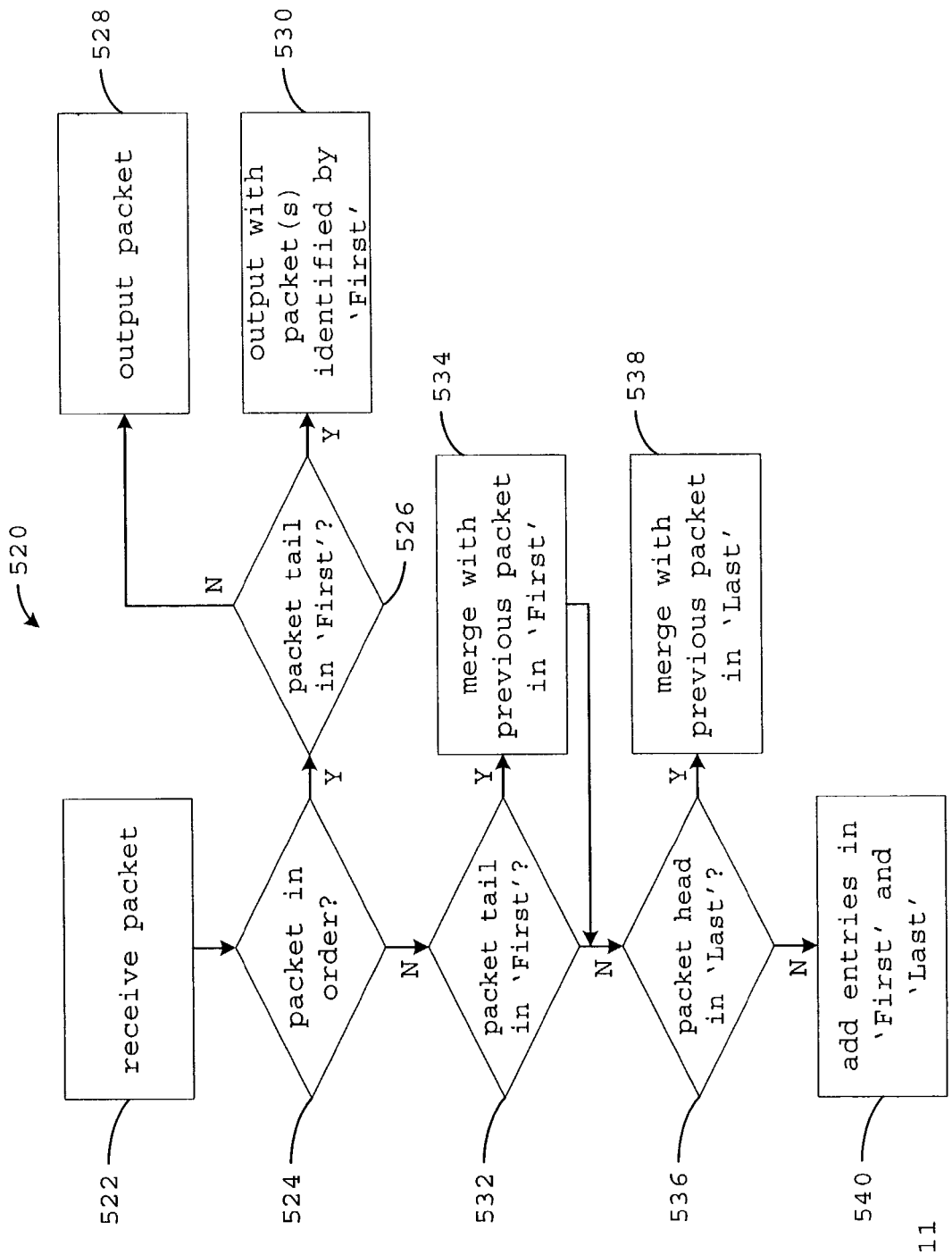
FIG. 11 is a flowchart of a process to track out-of-order packets.

FIG. 11 depicts a flowchart of a process 520 for implementing the scheme illustrated above. As shown, after receiving 522 a packet, the process 520 determines 524 if the packet is in-order (e.g., whether the packet includes the next expected sequence number). If not, the process 520 determines 532 whether the end of the received packet borders the start of an existing packet chain. If so, the process 520 can modify 534 the data stored in content-addressable memory to reflect the larger, merged packet chain starting at the received packet and ending at the end of the previously existing packet chain. The process 520 also determines 536 whether the start of the received packet borders the end of an existing packet chain. If so, the process 520 can modify 538 the data stored in content-addressable memory to reflect the larger, merged packet chain ending with the received packet.

Potentially, the received packet may border pre-existing packet chains on both sides. In other words, the newly received packet fills a hole between two chains. Since the process 520 checks both starting 532 and ending 536 borders of the received packet, a newly received packet may cause the process 520 to join two different chains together into a single monolithic chain.

As shown, if the received packet does not border a packet chain, the process 520 stores 540 data in content-addressable memory for a new packet chain that, at least initially, includes only the received packet.

If the received packet is in-order, the process 520 can query 526 the content-addressable memory to identify a bordering packet chain following the received packet. If such a chain exists, the process 520 can output the newly received packet to an application along with the data of other packets in the adjoining packet chain.

Figure 12:
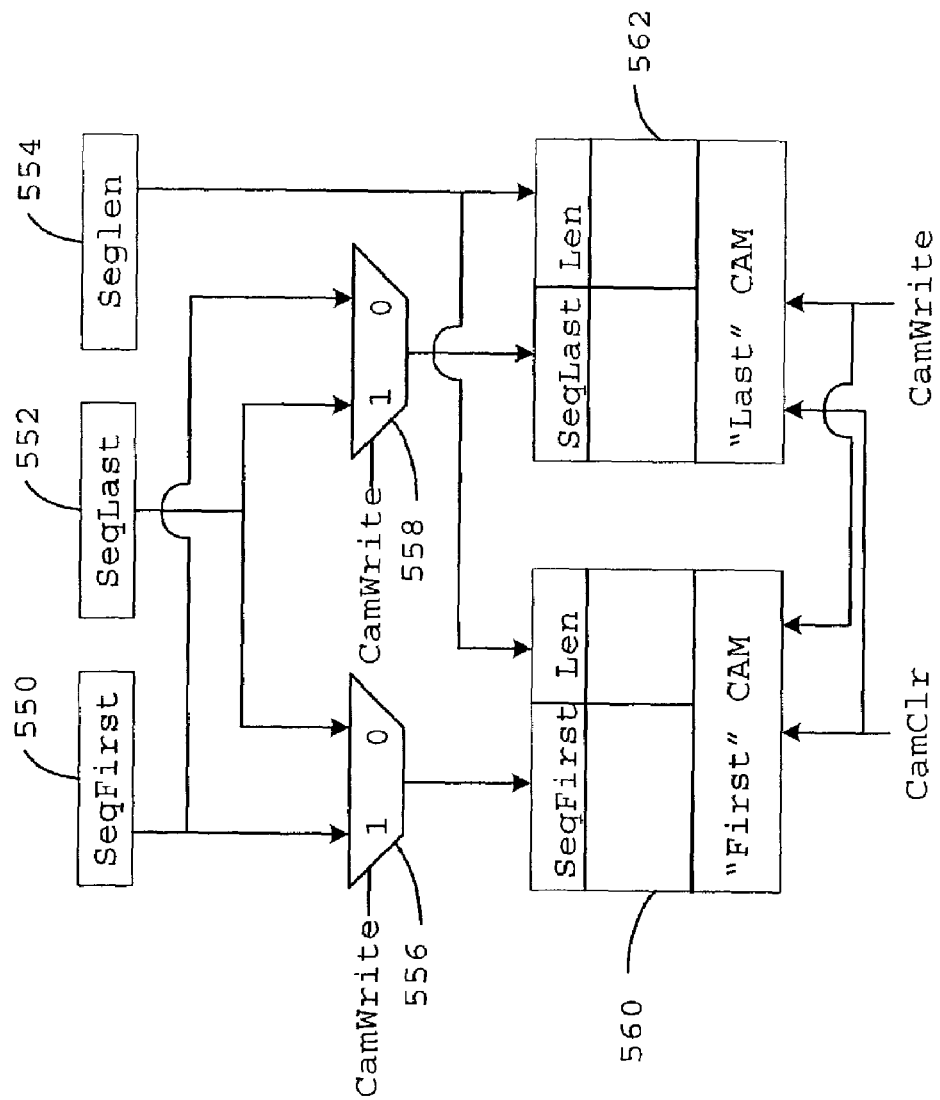
FIGS. 12–13 are schematics of a system to track out-of-order that includes content-addressable memory.
Figure 13:
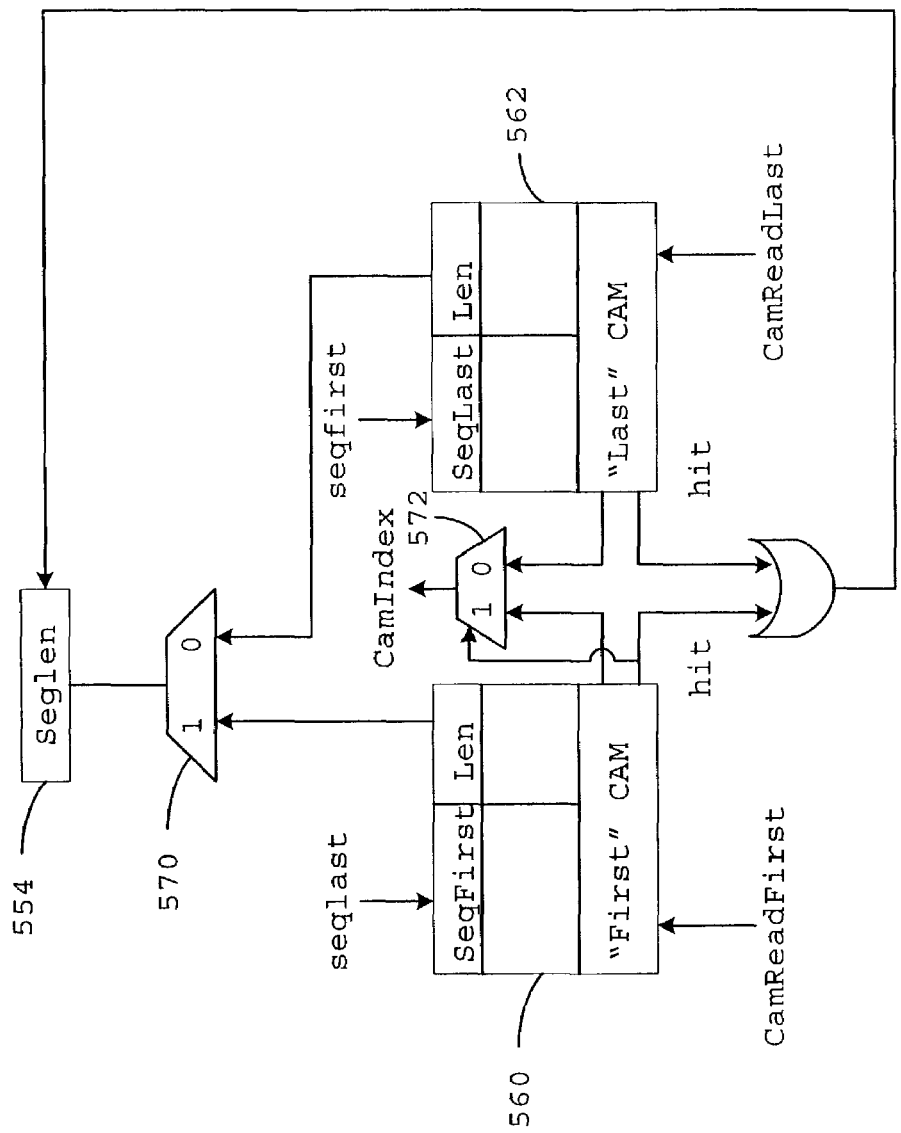

This process may be implemented using a wide variety of hardware, firmware, and/or software. For example, FIGS. 12 and 13 depict a hardware implementation of the scheme described above. As shown in these figures, the implementation features two content-addressable memories 560, 562—one 560 stores the first sequence number of an out-of-order packet chain as the key and the other 562 stores the last+1 sequence number of the chain as the key. As shown, both CAMs 560, 562 also store the length of chain. Other implementations may use a single CAM. Still other implementations use address-based memory or other data storage instead of content-addressable memory.

Potentially, the same CAM(s) 560, 562 can be used to track packets of many different connections. In such cases, a connection ID may be appended to each CAM entry as part of the key to distinguish entries for different connections. The merging of packet information into chains in the CAM(s) 560, 562 permits the handling of more connections with smaller CAMs 560, 562.

As shown in FIG. 12, the implementation includes registers that store a starting sequence number 550, ending sequence number 552, and a data length 554. The processor 122 shown in FIG. 2 may access these registers 550, 552, 554 to communicate with the sub-system 500. For example, the processor 122 can load data of a newly received packet into the sub-system 500 data. The processor 122 may also request a next expected sequence number to include in an acknowledgement message sent back to the sender.

As shown, the implementation operates on control signals for reading from the CAM(s) 560, 562 (CAMREAD), writing to the CAMs 560, 562 (CAMWRITE), and clearing a CAM 560, 562 entry (CAMCLR). As shown in FIG. 12, the hardware may be configured to simultaneously write register values to both CAMs 560, 562 when the registers 550, 552, 554 are loaded with data. As shown in FIG. 13, for "hits" for a given start or end sequence number, the circuitry sets the "seglen" register to the length of a matching CAM entry. Circuitry (not shown) may also set the values of the "seqfirst" 550 and "seqlast" 552 registers after a successful CAM 560, 562 read operation. The circuitry may also provide a "CamIndex" signal that identifies a particular "hit" entry in the CAM(s) 560, 562.

To implement the packet tracking approach described above, the sub-system 500 may feature its own independent controller that executes instructions implementing the scheme or may feature hard-wired logic. Alternately, a processor 122 (FIG. 1) may include instructions for the scheme. Potentially, the processor 122 instruction set (FIG. 4) may be expanded to include commands that access the sub-system 500 CAMs 560, 562. Such instructions may include instructions to write data to the CAM(s) 560, 562 (e.g., CAM2FirstWR key<--data for CAM 510 and CAM2LastWR key<--data for CAM 512); instructions to read data from the CAM(s) (e.g., CAM2FirstRD key-->data and CAM2LastRD key-->data); instructions to clear CAM entries (e.g., CAM2CLR key), and/or instructions to generate a condition value if a lookup failed (e.g., CAM2EMPTY-->cond).

Figure 14:
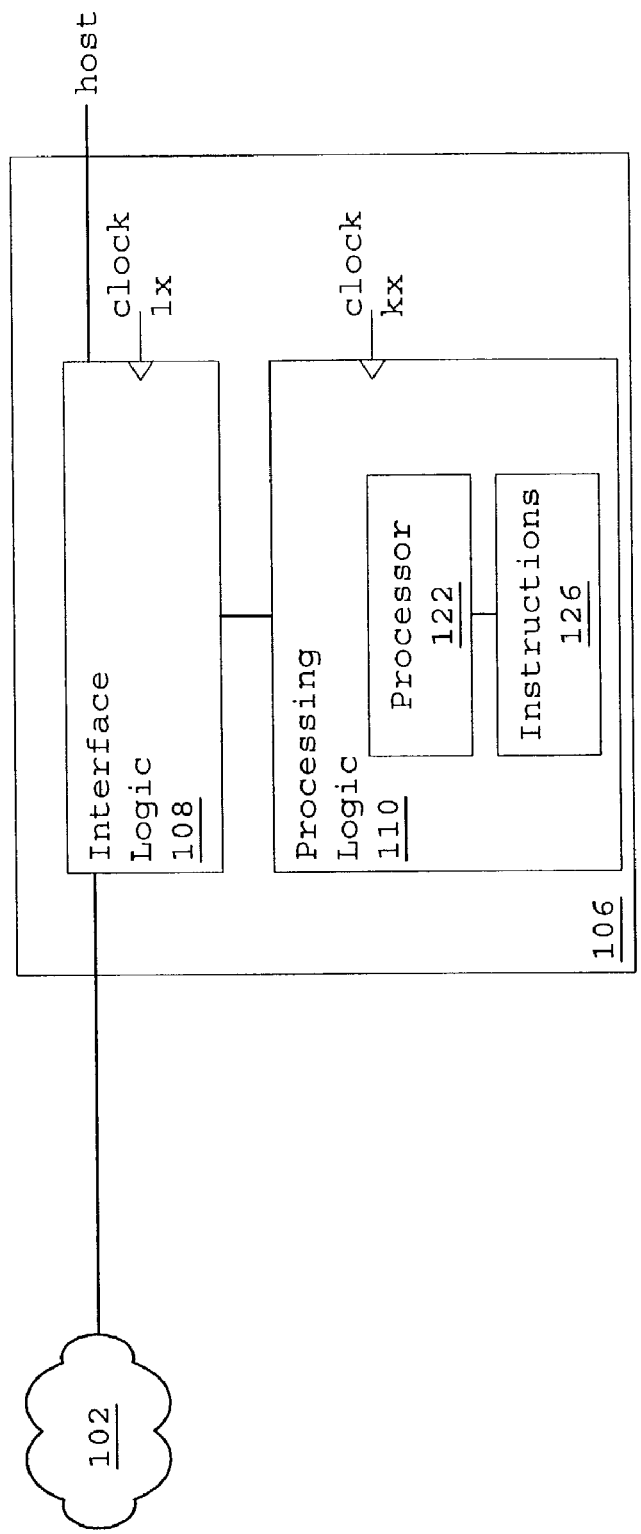
FIG. 14 is a diagram of a network protocol engine featuring different clock signals.

Referring to FIG. 14, potentially, the interface 108 and processing 110 logic components may be clocked at the same rate. A clock signal essentially determines how fast a logic network will operate. Unfortunately, due to the fact that many instructions may be executed for a given packet, to operate at wire-speed, the system 106 might be clocked at a very fast rate far exceeding the rate of the connection. Running the entire system 106 at a single very fast clock can both consume a tremendous amount of power and generate high temperatures that may affect the behavior of heat-sensitive silicon.

Instead, as shown in FIG. 14, components in the interface 108 and processing 110 logic may be clocked at different rates. As an example, the interface 108 components may be clocked at a rate, "1×", corresponding to the speed of the network connection. Since the processing logic 110 may be programmed to execute a number of instructions to perform appropriate network protocol operations for a given packet, processing logic 110 components may be clocked at a faster rate than the interface 108. For example, components in the processing logic 110 may be clocked at some multiple "k" of the interface 108 clock frequency where "k" is sufficiently high to provide enough time for the processor 122 to finish executing instructions for the packet without falling behind wire speed. Systems 106 using the "dual-clock" approach may feature devices known as "synchronizers" (not shown) that permit differently clocked components to communicate.

As an example of a "dual-clock" system, for a system 106 having an interface 108 data width of 16-bits, to achieve 10 gigabits per second, the interface 108 should be clocked at a frequency of 625 MHz (e.g., [16-bits per cycle]×[625,000,000 cycles per second]=10,000,000,000 bits per second). Assuming a smallest packet of 64 bytes (e.g., a packet only having IP and TCP headers, frame check sequence, and hardware source and destination addresses), it would take the 16-bit/625 MHz interface 108 32-cycles to receive the packet bits. Potentially, an inter-packet gap may provide additional time before the next packet arrives. If a set of up to n instructions is used to process the packet and a different instruction can be executed each cycle, the processing block 110 may be clocked at a frequency of k·(625 MHz) where k=n-instructions/32-cycles. For implementation convenience, the value of k may be rounded up to an integer value or a value of $2^n$ though neither of these is a strict requirement.

Since components run by a faster clock generally consume greater power and generate more heat than the same components run by a slower clock, clocking the different components 108, 110 at different speeds according to their need can enable the system 106 to save power and stay cooler. This can both reduce the power requirements of the system 106 and can reduce the need for expensive cooling systems.

Power consumption and heat generation can be reduced even further. That is, the system 106 depicted in FIG. 14 featured system 106 logic components clocked at different, fixed rates determined by "worst-case" scenarios to ensure that the processing block 110 keeps pace with wire-speed. As such, the smallest packets that require the quickest processing acted as a constraint on the processing logic 110 clock speed. In practice, however, most packets, nearly 95%, feature larger packet sizes and afford the system 106 more time for processing before the next packet arrives.

Figure 15:
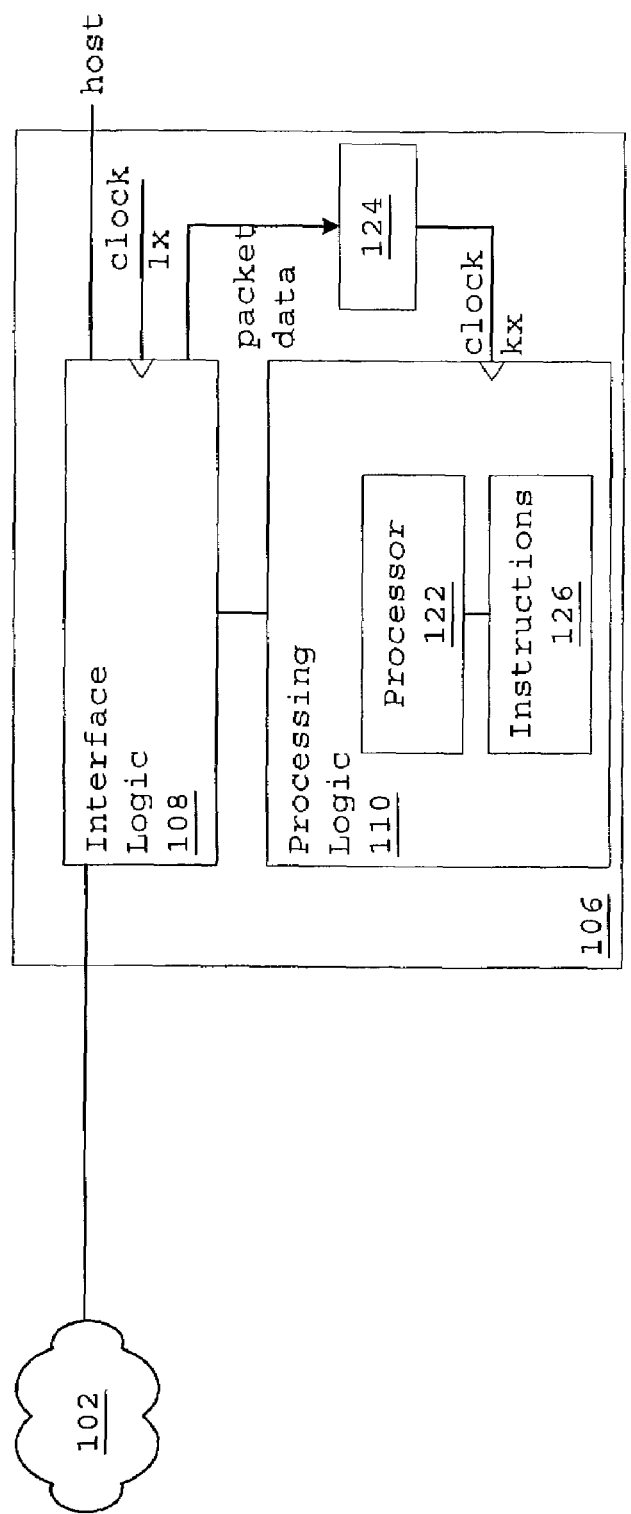
FIG. 15 is a diagram of a network protocol engine featuring a clock signal based on one or more packet characteristics.

Thus, instead of permanently tailoring the system 106 to handle difficult scenarios, FIG. 15 depicts a system 106 that provides a clock signal to processing logic 110 components at frequencies that can dynamically vary based on one or more packet characteristics. For example, a system 106 may use data identifying a packet's size (e.g., the length field in the IP datagram header) to scale the clock frequency. For instance, for a bigger packet, the processor 122 has more time to process the packet before arrival of the next packet, thus, the frequency could be lowered without falling behind wire-speed. Likewise, for a smaller packet, the frequency may be increased. Adaptively scaling the clock frequency "on the fly" for different incoming packets can reduce power by reducing operational frequency when processing larger packets. This can, in turn, result in a cooler running system that may avoid the creation of silicon "hot spots" and/or expensive cooling systems.

As shown in FIG. 15, scaling logic 124 receives packet data and correspondingly adjusts the frequency provided to the processing logic 110. While discussed above as operating on the packet size, a wide variety of other metrics may be used to adjust the frequency such as payload size, quality of service (e.g., a higher priority packet may receive a higher frequency), protocol type, and so forth. Additionally, instead of the characteristics of a single packet, aggregate characteristics may be used to adjust the clock rate (e.g., average size of packets received). To save additional power, the clock may be temporarily disabled when the network is idle.

Figure 16:
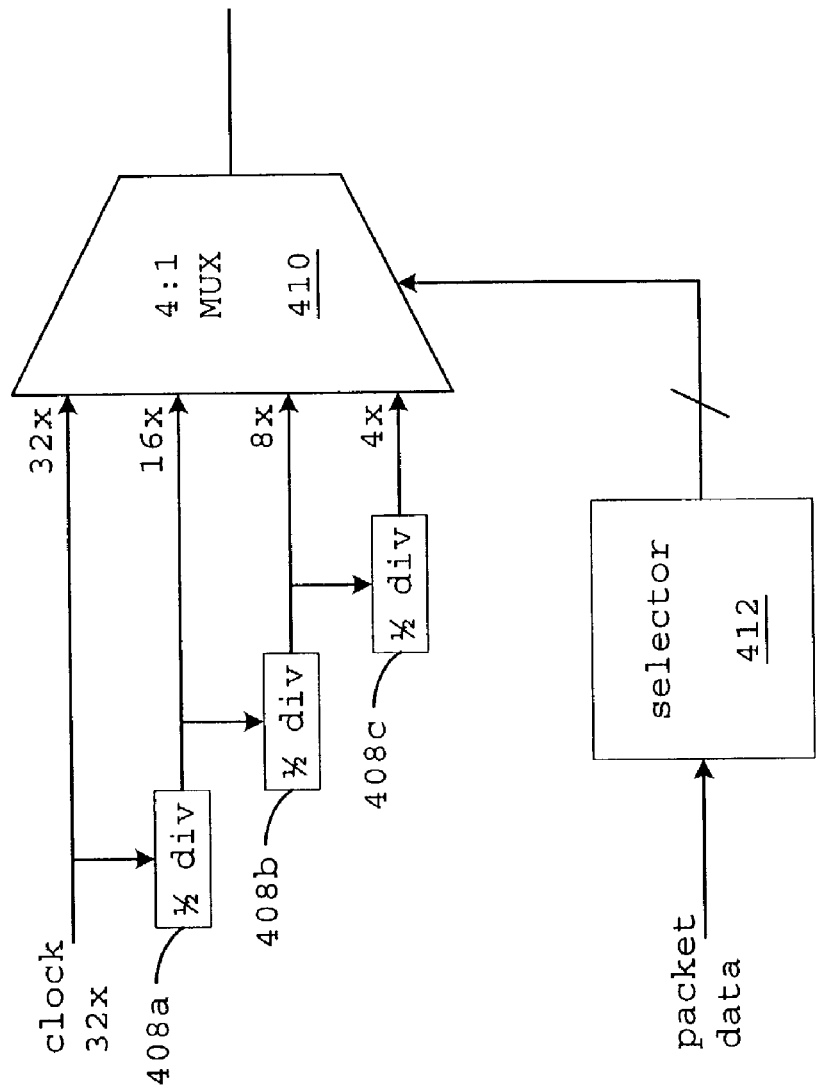
FIG. 16 is a diagram of a mechanism for providing a clock signal based on one or more packet characteristics.

The scaling logic 124 may be implemented in wide variety of hardware and/or software schemes. For example, FIG. 16 depicts a hardware scheme that uses dividers 408a–408c to offer a range of available frequencies (e.g., 32×, 16×, 8×, and 4×). The different frequency signals are fed into a multiplexer 410 for selection based on packet characteristics. For example, a selector 412 may feature a magnitude comparator that compares packet size to different pre-computed thresholds. For example, a comparator may use different frequencies for packets up to 64 bytes in size (32×), between 64 and 88 bytes (16×), between 88 and 126 bytes (8×), and 126 to 236 (4×). These thresholds may be determined such that the processing logic clock frequency satisfies the following equation:

$$[(\text{packet size}/\text{data-width})/\text{interface-clock-frequency}] >=$$
$$(\text{interface-clock-cycles}/\text{interface-clock-frequency}) +$$
$$(\text{maximum number of instructions}/\text{processing-clock-frequency}).$$

While FIG. 16 illustrates four different clocking signals, other implementations may feature n-clocking signals. Additionally, the relationship between the different frequencies provided need not be uniform fractions of one another as shown in FIG. 16.

The resulting clock signal can be routed to different components within the processing logic 110. However, not all components within the processing logic 110 and interface 108 blocks need to run at the same clock frequency. For example, in FIG. 2, while the input sequencer 116 receives a "1×" clock signal and the processor 122 receives a "k×" "clock signal", the connection data memory 112 and CAM 114 may receive the "1×" or the "k×" clock signal, depending on the implementation.

Placing the scaling logic 124 physically near a frequency source can reduce power consumption. Further, adjusting the clock at a global clock distribution point both saves power and reduces logic need to provide clock distribution.

Again, a wide variety of implementations may use one or more of the techniques described above. Additionally, the system 106 may appear in a variety of forms. For example, the system 106 may be designed as a single chip. Potentially, such a chip may be included in a chipset or on a motherboard. Further, the system 106 may be integrated into components such as a network adaptor, NIC (Network Interface Card), or MAC (medium access device). Potentially, techniques described herein may integrated into a micro-processor.

A system 106 may also provide operations for more than one protocol. For example, a system 106 may offer operations for both network and transport layer protocols. The system 106 may be used to perform network operations for a wide variety of hosts such as storage switches and application servers. Other embodiments are within the scope of the following claim

| Appendix A | |
|---|---|
| END: | TCBWR index |
| IDLE: | JMP IDLE |
| LBLLISTEN: | SUB rcv[len], HEADERLEN --> seglen |
| | AND rcv[code], RST --> cond |
| | BRNEQZ IDLE |
| | AND rcv[code], ACK --> cond |
| | BRNEQZ TCPRST |
| | AND rcv[code], SYN --> cond |
| | BRNEQZ TCPINITWIN |
| | JMP TCPRST |
| LBLLISTEN1: | LOAD wkreg[state] <-- SYNRCVD |
| | JMP END |
| LBLSYNRCVD: | JMP TCPSEQOK |
| LBLSYNRCVD1: | AND rcv[code], ACK --> cond |
| | BREQZ IDLE |
| | CMP wkreg[suna], rcv[ack] --> cond |
| | BRNEQZ TCPRST |
| | CMP rcv[ack], wkreg[snext] --> cond |
| | BRNEQZ TCPRST |
| | ADD wkreg[suna], 1 --> wkreg[suna] |
| | JMP TCPDATAPROC |
| LBLSYNRCVD4: | AND wkreg[flags], RDONE --> R0 |
| | EQUAL R0, 0 --> cond |
| | BRNEQZ LBLSYNRCVD5 |
| | LOAD wkreg[state] <-- CLOSEWAIT |
| | JMP END |
| LBLSYNRCVD5: | LOAD wkreg[state] <-- ESTABLISHED |
| | JMP END |
| LBLESTABLISHED: | JMP TCPSEQOK |
| LBLESTABLISHED4: | CMP wkreg[rbcount], 75RBSIZE --> cond |
| | BREQZ LBLESTABLISHED5 |
| | LOAD wkreg[rbcount] <-- 0 |
| LBLESTABLISHED5: | AND wkreg[flags], RDONE --> R0 |
| | EQUAL R0, 0 --> cond |
| | BRNEQZ END |
| | LOAD wkreg[state] <-- CLOSEWAIT |
| | JMP END |
| LBLCLOSEWAIT: | JMP TCPSEQOK |
| LBLLASTACK: | JMP TCPSEQOK |
| LBLLASTACK2: | AND rcv[code], ACK --> con |
| | BREQZ END |
| | CMP wkreg[suna], rcv[ack] --> cond |
| | BRNEQZ END |
| | CMP rcv[ack], wkreg[snext] --> cond |
| | BRNEQZ END |
| | JMP TCBDEALLOCATE |
| TCPRST: | LOAD snd[window] <-- 0 |
| | AND rcv[code], SYN --> cond |
| | BREQZ LBL02 |
| | ADD seglen, 1 --> seglen |

-continued

| Appendix A | |
|---|---|
| LBL02: | AND rcv[code], FIN --> cond |
| | BREQZ LBL03 |
| | ADD seglen, 1 --> seglen |
| LBL03: | AND rcv[code], ACK --> cond |
| | BRNEQZ LBL00 |
| | LOAD snd[seq] <-- 0 |
| | LOAD snd[code] <-- RST|ACK |
| | JMP LBL01 |
| LBL00: | MOV rcv[ack] --> snd[seq] |
| | LOAD snd[code] <-- RST |
| LBL01: | ADD rcv[seq], seglen --> snd[ack] |
| | EQUAL wkreg[state], LISTEN --> cond |
| | BRNEQZ IDLE |
| | EQUAL wkreg[state], SYNRCVD --> cond |
| | BREQZ TCBDEALLOCATE |
| | AND rcv[code], SYN --> cond |
| | BRNEQZ TCBDEALLOCATE |
| | JMP IDLE |
| TCBDEALLOCATE: | CAM1CLR index |
| | JMP IDLE |
| TCPINITWIN: | LOAD wkreg[code] <-- SYN |
| | MOV rcv[window] --> wkreg[swindow] |
| | MOV rcv[seq] --> wkreg[lwseq] |
| | MOV rcv[seq] --> wkreg[rnext] |
| | ADD rcv[seq], RBSIZE --> wkreg[cwin] |
| | JMP TCPDATAPROC |
| TCPSENDWIN: | CMP wkreg[lwseq], rcv[seq] --> cond |
| | BRNEQZ LBL11 |
| | EQUAL rcv[seq], wkreg[lwseq] --> cond |
| | BREQZ LBL10 |
| | CMP wkreg[lwack], rcv[ack] --> cond |
| | BRNEQZ LBL11 |
| LBL10: | MOV rcv[window] --> wkreg[swindow] |
| | MOV rcv[seq] --> wkreg[lwseq] |
| | MOV rcv[ack] --> wkreg[lwack] |
| LBL11: | EQUAL wkreg[state], ESTABLISHED --> cond |
| | BRNEQZ LBLESTABLISHED4 |
| | OR wkreg[flags], SNDFIN --> wkreg[flags] |
| | JMP TCPACK |
| TCPSEQOK: | LOAD statusok <-- 0 |
| | SUB rcv[len], HEADERLEN --> seglen |
| | AND rcv[code], SYN --> cond |
| | BREQZ LBL20 |
| | ADD seglen, 1 --> seglen |
| LBL20: | AND rcv[code], FIN --> cond |
| | BREQZ LBL21 |
| | ADD seglen, 1 --> seglen |
| LBL21: | SUB RBSIZE, wkreg[rbcount] --> rwindow |
| | EQUAL rwindow, 0 --> cond |
| | BREQZ LBL22 |
| | EQUAL seglen, 0 --> cond |
| | BREQZ LBL22 |
| | EQUAL wkreg[rnext], rcv[seq] --> cond |
| | BREQZ LBL25 |
| | LOAD statusok <-- 1 |
| | JMP LBL25 |
| LBL22: | EQUAL rwindow, 0 --> cond |
| | BRNEQZ LBL25 |
| | ADD wkreg[rnext], rwindow --> seqwin |
| | ADD rcv[seq], seglen --> seqlast |
| | EQUAL seglen, 0 --> cond |
| | BRNEQZ LBL23 |
| | CMP seqlast, wkreg[rnext] --> cond |
| | MOV cond --> statusok |
| | CMP seqlast, seqwin --> cond |
| | NOT cond --> cond |
| | AND cond, statusok --> statusok |
| LBL23: | CMP wkreg[rnext], rcv[seq] --> cond |
| | BRNEQZ LBL25 |
| | CMP seqwin, rcv[seq] --> cond |
| | OR statusok, cond --> statusok |
| LBL25: | AND rcv[code], SYN --> cond |
| | BREQZ LBL26 |
| | SUB seglen, 1 --> seglen |
| LBL26: | AND rcv[code], FIN --> cond |
| | BREQZ LBL27 |
| | SUB seglen, 1 --> seglen |

-continued

Appendix A

```
LBL27:          EQUAL statusok, 0 --> cond
                BRNEQZ TCPACKOUT
                AND rcv[code], RST --> cond
                BRNEQZ TCBDEALLOCATE
                AND rcv[code], SYN --> cond
                BRNEQZ TCPRST
                EQUAL wkreg[state], SYNRCVD --> cond
                BRNEQZ LBLSYNRCVD1
                JMP TCPACKIN
TCPACKOUT:      CMP seglen, 0 --> cond
                BRNEQZ LBL30
                AND rcv[code], SYN|FIN --> cond
                BREQZ IDLE
LBL30:          LOAD snd[code] <-- ACK
                MOV wkreg[snext] --> snd[seq]
                MOV wkreg[rnext] --> snd[ack]
                SUB RBSIZE, wkreg[rbcount] --> rwindow
                CMP wkreg[state], SYNRCVD --> cond
                BREQZ LBL35
                SHL2 rwindow --> R0
                CMP RBSIZE, R0 --> cond
                BRNEQZ LBL32
                CMP RMSS, rwindow --> cond
                BREQZ LBL33
LBL32:          LOAD rwindow <-- 0
LBL33:          CMP wkreg[cwin], wkreg[rnext] --> cond
                BREQZ LBL34
                SUB wkreg[cwin], wkreg[rnext] --> R0
                CMP rwindow, R0 --> cond
                BRNEQZ LBL34
                MOV R0 --> rwindow
LBL34:          ADD wkreg[rnext], rwindow --> wkreg[cwin]
LBL35:          MOV rwindow --> snd[window]
                JMP END
TCPACK:         AND wkreg[flags], SNDFIN --> R0
                EQUAL R0, 0 --> cond
                BRNEQZ LBL60
                OR wkreg[code], FIN --> wkreg[code]
LBL60:          OR wkreg[code], ACK --> snd[code]
                AND wkreg[flags], ~NEEDOUT --> wkreg[flags]
                MOV wkreg[snext] --> snd[seq]
                AND wkreg[code], SYN|FIN --> cond
                BREQZ LBL61
                ADD wkreg[snext], 1 --> wkreg[snext]
LBL61:          MOV wkreg[rnext] --> snd[ack]
                SUB RBSIZE, wkreg[rbcount] --> rwindow
                CMP wkreg[state], SYNRCVD --> cond
                BREQZ LBL65
                SHL2 rwindow --> R0
                CMP RBSIZE, R0 --> cond
                BRNEQZ LBL62
                CMP RMSS, rwindow --> cond
                BREQZ LBL63
LBL62:          LOAD rwindow <-- 0
LBL63:          SUB wkreg[cwin], wkreg[rnext] --> R0
                CMP rwindow, R0 --> cond
                BRNEQZ LBL64
                MOV R0 --> rwindow
LBL64:          ADD wkreg[rnext], rwindow --> wkreg[cwin]
LBL65:          MOV rwindow --> snd[window]
                AND wkreg[code], 0 --> wkreg[code]
                EQUAL wkreg[state], LISTEN --> cond
                BRNEQZ LBLLISTEN1
                EQUAL wkreg[state], SYNRCVD --> cond
                BRNEQZ LBLSYNRCVD4
                EQUAL wkreg[state], ESTABLISHED --> cond
                BRNEQZ TCPSENDWIN
                EQUAL wkreg[state], CLOSEWAIT --> cond
                BREQZ END
                LOAD wkreg[state] <-- LASTACK
                JMP END
TCPACKIN:       AND rcv[code], ACK --> cond
                BREQZ LBL41
                CMP rcv[ack], wkreg[suna] --> cond
                BREQZ IDLE
                CMP rcv[ack], wkreg[snext] --> cond
                BRNEQZ TCPACKOUT
                MOV rcv[ack] --> wkreg[suna]
                AND wkreg[code], SYN --> cond
                BREQZ LBL40
                AND wkreg[code], ~SYN --> wkreg[code]
                AND wkreg[flags], ~FIRSTSEND --> wkreg[flags]
LBL40:          AND wkreg[code], FIN --> cond
                BREQZ LBL41
                EQUAL wkreg[snext], rcv[ack] --> cond
                BREQZ LBL41
                AND wkreg[code], ~FIN --> wkreg[code]
                AND wkreg[flags], ~SNDFIN --> wkreg[flags]
LBL41:          EQUAL wkreg[state], CLOSEWAIT --> cond
                BRNEQZ TCPSENDWIN
                EQUAL wkreg[state], ESTABLISHED --> cond
                BRNEQZ TCPDATAPROC
                EQUAL wkreg[state], LASTACK --> cond
                BRNEQZ LBLLASTACK2
                JMP END
TCPDATAPROC:    MOV rcv[code] --> statusok
                MOV rcv[seq] --> seqfirst
                AND statusok, URG --> cond
                BREQZ LBL51
                ADD seqfirst, rcv[urgptr] --> R0
                AND wkreg[flags], RUPOK --> rwindow
                EQUAL rwindow, 0 --> cond
                BRNEQZ LBL50
                CMP R0, wkreg[rupseq] --> cond
                BREQZ LBL51
LBL50:          MOV R0 --> wkreg[rupseq]
                OR wkreg[flags], RUPOK --> wkreg[flags]
LBL51:          AND statusok, SYN --> cond
                BREQZ LBL52
                ADD wkreg[rnext], 1 --> wkreg[rnext]
                OR wkreg[flags], NEEDOUT --> wkreg[flags]
                ADD seqfirst, 1 --> seqfirst
LBL52:          SUB RBSIZE, wkreg[rbcount] --> rwindow
                ADD wkreg[rnext], rwindow --> seqwin
                ADD seqfirst, seglen --> seqlast
                CMP wkreg[rnext], seqfirst --> cond
                BREQZ LBL53
                SUB wkreg[rnext], seqfirst --> R0
                SUB seglen, R0 --> seglen
                MOV wkreg[rnext] --> seqfirst
LBL53:          CMP seqlast, seqwin --> cond
                BREQZ LBL54
                SUB seqlast, seqwin --> R0
                SUB seglen, R0 --> seglen
                AND statusok, ~FIN --> statusok
LBL54:          EQUAL seqfirst, wkreg[rnext] --> cond
                BREQZ LBL55
                CMP seglen, 0 --> cond
                BREQZ LBL56
                ADD wkreg[rnext], seglen --> wkreg[rnext]
                ADD wkreg[rbcount], seglen --> wkreg[rbcount]
LBL512:         CAM2EMPTY cond
                BRNEQZ LBL511
                CAM2LLKUP seqlast
                BREQZ LBL511
                CAM2CLR [cam2_idx]
                ADD wkreg[rnext], seglen --> wkreg[rnext]
                ADD wkreg[rbcount], seglen --> wkreg[rbcount]
LBL511:         EQUAL wkreg[finseq], wkreg[rnext] --> cond
                BRNEQZ ALLDONE
                CMP wkreg[pushseq], wkreg[rnext] --> cond
                BRNEQZ NEXT
                OR statusok, PSH --> statusok
                LOAD wkreg[pushseq] <-- 0
                JMP NEXT
ALLDONE:        OR statusok, FIN --> statusok
NEXT:           OR wkreg[flags], NEEDOUT --> wkreg[flags]
LBL56:          AND statusok, FIN --> cond
                BREQZ LBL58
                OR wkreg[flags], RDONE|NEEDOUT --> wkreg[flags]
                ADD wkreg[rnext], 1 --> wkreg[rnext]
LBL58:          AND statusok, PSH|URG --> cond
                BREQZ NEXTP1
```

-continued

Appendix A

```
                OR wkreg[flags], PUSH --> wkreg[flags]
                JMP NEXTP1
LBL55:          AND statusok, FIN --> cond
                BREQZ LBL59
                ADD seqfirst, seglen --> wkreg[finseq]
LBL59:          AND statusok, PSH|URG --> cond
                BREQZ LBL510
                ADD seqfirst, seglen --> wkreg[pushseq]
LBL510:         AND statusok, ~(FIN|PSH) --> statusok
                CAM2LLKUP seqlast
                BREQZ LBL515
                CAM2CLR [cam2_idx]
                ADD seqlast, seglen --> seqlast
                SUB seqlast, seqfirst --> seglen
LBL515:         CAM2RLKUP seqfirst
                BREQZ LBL516
                CAM2CLR [cam2_idx]
                SUB seqfirst, seglen --> seqfirst
                SUB seqlast, seqfirst --> seglen
LBL516:         CAM2WR seglen
                OR wkreg[flags], NEEDOUT --> wkreg[flags]
NEXTP1:         AND wkreg[flags], NEEDOUT --> R0
                EQUAL R0, 0 --> cond
                BREQZ TCPACK
                EQUAL wkreg[state], LISTEN --> cond
                BRNEQZ LBLLISTEN1
                EQUAL wkreg[state], SYNRCVD --> cond
                BRNEQZ LBLSYNRCVD4
                EQUAL wkreg[state], ESTABLISHED --> cond
                BRNEQZ TCPSENDWIN
                JMP END
```

What is claimed is:

1. A Transmission Control Protocol (TCP) off-load system, the system comprising:
a first interface circuitry to
receive at least a portion of an Internet Protocol packet encapsulating a TCP segment; and
extract data from the at least a portion of the Internet Protocol packet including, at least, the Internet Protocol source address, the Internet Protocol destination address, the source port, and the destination port;
wherein the first interface circuitry is clocked at a first clock signal having a first frequency;
a second interface to a host processor; and
an off-load system processor to process the TCP segment for the host processor, the off-load system processor to, at least, generate a TCP acknowledgement (ACK) message for the received TCP segment and to transmit a payload of the TCP segment to the host processor via the second interface, the off-load system processor clocked at a second clock signal having a second frequency different than the first frequency wherein the second frequency is determined based on packet size.

2. The system of claim 1, wherein the second frequency comprises a higher frequency than the first frequency.

3. The system of claim 1, wherein the off-load system processor comprises an off-load system processor to perform at least one of the following operations: maintain a TCP state machine for different connections and determine TCP window for different connections.

4. The system of claim 1, wherein the second interface comprises an interface to a Peripheral Component Interface (PCI) bus that connects the system to the host processor.

5. The system of claim 1, wherein the second frequency comprises a frequency selected based on a number of instructions to be executed by the off-load system processor for a packet.

6. The system of claim 1, wherein the second frequency is determined based on one or more packet characteristics.

7. The system of claim 1, further comprising a content-addressable memory to store identifiers for different connections.

8. The system of claim 7, further comprising a memory to store connection context data, the memory coupled to the content-addressable memory.

9. The system of claim 1, wherein the first interface receives packet data received via a medium access control (MAC) device.

10. The system of claim 1, wherein the off-load system processor comprises an arithmetic logic unit and a memory storing instructions for execution.

11. The system of claim 10, wherein the instructions comprise instructions to process the TCP segment in accordance with the TCP protocol.

12. The system of claim 10, wherein the instructions comprise instructions from a micro-code instruction set that includes at least one instruction to access connection data.

13. The system of claim 10, wherein the instructions comprise instructions from a micro-code instruction set that includes at least one instruction specifying a content-addressable memory operation.

14. The system of claim 1, wherein the first frequency comprises a frequency selected to process a network connection receiving data at a rate of ten gigabits per second.

15. The system of claim 1, where in the processing logic further comprises at least one content-addressable memory to track received out-of-order data packets.

16. The off-load system of claim 1, wherein the second frequency is an integral multiple of the first frequency.

17. The off-load system of claim 1, wherein the first interface comprises an interface to perform a lookup based on the extracted data in a content-addressable memory that stores data indicating whether a Transmission Control Block (TCB) associated with the packet is stored by the off-load system.

18. A system, the system comprising:
at least one host processor;
an Ethernet medium access control (MAC) device providing a network connection at a connection speed;
a Transmission Control Protocol (TCP) off-load engine coupled to the MAC device and the at least one host processor to perform TCP operations for the at least one host processor, the network protocol off-load engine comprising:
an interface to a Peripheral Component Interconnect (PCI) bus connecting the network protocol off-load engine and the at least one host processor; circuitry to:
receive at least a portion of an Internet Protocol packet encapsulating a TCP segment from the MAC device and
extract data from the at least a portion of the Internet Protocol packet including, at least, the Internet Protocol source address, the Internet Protocol destination address, the source port, and the destination port;
wherein the circuitry is clocked by a first clock signal at a first frequency, the first frequency corresponding to the connection speed; and an off-load engine processor to at least, generate a TCP acknowledgement (ACK) message for the received TCP segment and to transmit a payload of the TCP segment to the host processor via the interface to the PCI bus;
wherein the off-load engine processor is clocked by a second clock signal at a second frequency different than the first frequency wherein the second frequency is determined based packet size.

19. The system of claim 18, wherein second frequency comprises a frequency based on one or more characteristics of at least one packet.

20. The system of claim 18, wherein the system comprises:
a first set of at least one content-addressable memory to store data associated with different network connections; and
a second set of at least one content-addressable memory to track packets received out-of-order.

21. The system of claim 18, wherein the interface to a PCI bus comprises an interface to a PCI-X bus.

22. A method of off-loading Transmission Control Protocol operations from a host processor, the method comprising:
receiving at least a portion of a an Internet Protocol packet encapsulating a TCP segment at circuitry clocked by a first clock signal having a first frequency;
extracting data at the circuitry clocked by the first clock signal from the at least a portion of the Internet Protocol packet including, at least, the Internet Protocol source address, the Internet Protocol destination address, the source port, and the destination port; and
processing the TCP segment at processing circuitry comprising an off-load processor to, at least, generate a TCP acknowledgement (ACK) message for the received TCP segment and to transmit a payload of the TCP segment to the host processor via a second interface the off-load processor being clocked by a source of a second clock signal having a second frequency different than the first frequency wherein the second frequency is determined based on packet size.

23. The method of claim 22, wherein the processor to transmit the TCP segment payload to the host processor via a second interface comprises a processor to transmit the TCP segment payload to the host processor via a Peripheral Component Interconnect (PCI) bus.

24. The method of claim 22, further comprising determining the second frequency.

25. The method of claim 22, further comprising, at the circuitry clocked by a first clock signal, accessing a content-addressable memory to retrieve an identifier for a connection of the packet.

26. The method of claim 22, further comprising accessing a content-addressable memory to track packets received out-of-order.

* * * * *